(12) United States Patent
Ikeda et al.

(10) Patent No.: US 7,032,569 B2
(45) Date of Patent: Apr. 25, 2006

(54) THROTTLE CONTROL DEVICES

(75) Inventors: Tsutomu Ikeda, Aichi-ken (JP); Koji Yoshikawa, Aichi-ken (JP); Kazumasa Nakashima, Aichi (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 17 days.

(21) Appl. No.: 10/839,797

(22) Filed: May 6, 2004

(65) Prior Publication Data

US 2004/0231644 A1 Nov. 25, 2004

(30) Foreign Application Priority Data

| May 8, 2003 | (JP) | ............................. 2003-130435 |
| May 8, 2003 | (JP) | ............................. 2003-130436 |
| May 8, 2003 | (JP) | ............................. 2003-130437 |

(51) Int. Cl.
*F02D 9/00* (2006.01)
(52) U.S. Cl. ...................................... 123/399; 123/361
(58) Field of Classification Search ............... 123/361, 123/399
See application file for complete search history.

(56) References Cited

U.S. PATENT DOCUMENTS

| 4,392,375 A * | 7/1983 | Eguchi et al. ............. 73/118.1 |
| 5,738,072 A * | 4/1998 | Bolte et al. .................. 123/399 |
| 6,446,600 B1* | 9/2002 | Scherer et al. .............. 123/399 |
| 6,543,417 B1* | 4/2003 | Tanaka et al. ............... 123/361 |
| 6,701,892 B1* | 3/2004 | Wayama et al. ............. 123/399 |
| 6,912,994 B1* | 7/2005 | Ozeki et al. ................. 123/399 |
| 2004/0079331 A1* | 4/2004 | Kaiser et al. ............... 123/399 |

FOREIGN PATENT DOCUMENTS

| JP | 200159702 | 3/2001 |
| JP | 2002256896 | 9/2002 |

* cited by examiner

*Primary Examiner*—Erick Solis
(74) *Attorney, Agent, or Firm*—Dennison, Schultz, Dougherty & MacDonald

(57) ABSTRACT

A throttle control device includes a throttle body that defines an intake air channel. A motor is coupled to a throttle shaft. As the motor is driven, the throttle valve rotates to open and close the intake air channel. A detection device serves to detect a degree of opening of the throttle valve and includes a pair of magnets and a sensor. The magnets are mounted to the throttle shaft via a magnet support and are positioned to oppose each other with respect to a rotational axis of the throttle shaft in order to produce a magnetic field. The sensor is mounted to the throttle body and serves to detect the magnetic field. The sensor comprises a sensing section and a computing section connected to each other. The sensing section may be inclined relative to the computing section in order to form a compact shape.

37 Claims, 20 Drawing Sheets

OUTER SIDE ⟵⟶ INNER SIDE

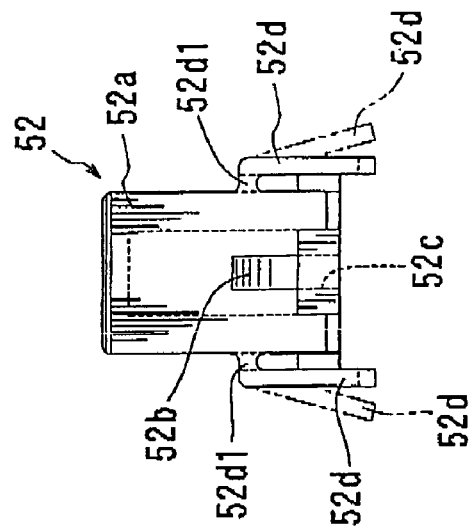
FIG. 18
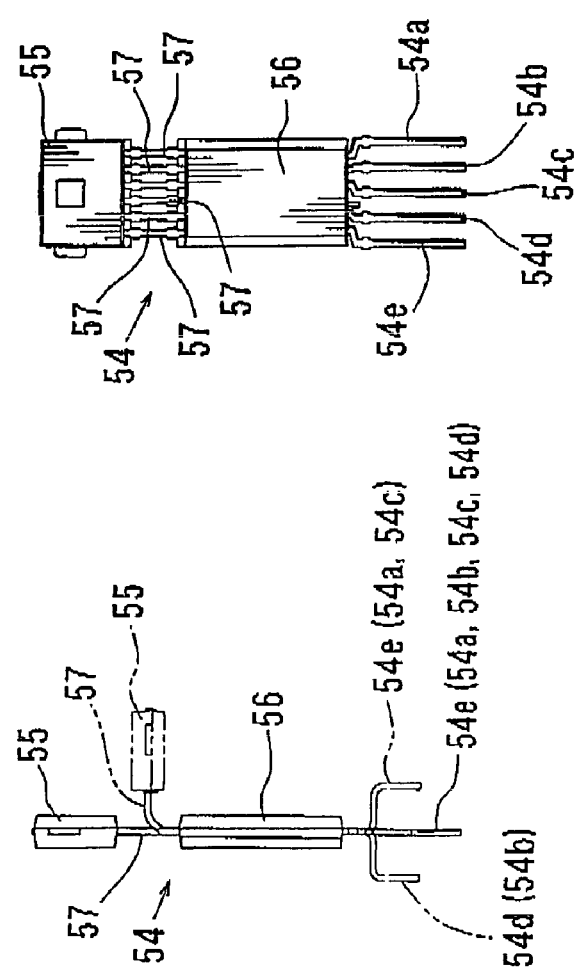
FIG. 19
FIG. 20

THROTTLE CONTROL DEVICES

This application claims priorities to Japanese patent application serial numbers 2003-130435, 2003-130436 and 2003-130437, the contents of which are incorporated herein by reference.

BACKGROUND OF THE INVENTION

1. Field of the Invention

The present invention relates to throttle control devices for controlling a flow rate of intake air supplied to an engine, e.g., an internal combustion engine of an automobile, and in particular to throttle control devices that are electrically or electronically controlled.

2. Description of the Related Art

Japanese Laid-Open Patent Publication No. 2001-59702 teaches a known throttle control device that includes a throttle valve disposed within an intake air channel formed in a throttle body. The throttle valve is rotatably driven by a motor in order to open and close the intake air channel, so that the flow rate of the intake air is controlled. The throttle control device further includes a throttle sensor (also known as "throttle position sensor") that detects the degree of opening of the throttle valve. The throttle sensor includes a pair of magnets and a magnetic detecting element, such as a Hall element. The magnets are attached to a support member. The support member is mounted to a throttle shaft that rotates in unison with the throttle valve, so the magnets are positioned to oppose each other with respect to the rotational axis of the support member. The magnetic detecting element is mounted to the throttle body. The magnetic detecting element detects the intensity of the magnetic field produced by the magnets and outputs the detected intensity as signals that represent the degree of opening of the throttle valve.

However, in some cases a magnetic section and an output computing section connected in series with the magnetic section, via connecting terminals, may be incorporated as a magnetic detecting element. In such cases, the magnetic detection element may have an elongated configuration due to the serial connection between the magnetic section and the output computing section. In order to assemble such an elongated magnetic detection element within a throttle body, the throttle body must have a relatively large size.

SUMMARY OF THE INVENTION

It is accordingly an object of the present invention to teach improved throttle control devices that can reduce the size of a throttle body.

According to one aspect of the present teachings, throttle control devices are taught that include a throttle body. An intake air channel is defined within the throttle body. A throttle valve is mounted to a throttle shaft and is disposed within the intake air channel. A motor is coupled to the throttle shaft. As the motor is driven, the throttle valve rotates to open and close the intake air channel so as to control the flow rate of intake air through the intake air channel. A detection device detects a degree of opening of the throttle valve and includes a pair of magnets and a sensor. The magnets are mounted to the throttle shaft and are positioned to oppose each other with respect to the rotational axis of the throttle shaft in order to produce a magnetic field. The sensor is mounted to the throttle body and serves to detect the magnetic field. The sensor comprises a sensing section and a computing section connected in series with one another. The sensing section may be inclined relative to the computing section.

Therefore, the sensor may have a relatively short length in the connecting direction between the sensing section and the computing section. As a result, the throttle body as well as the detection device may have a compact size.

The sensing section and the computing section are connected to each other via connecting terminals that are bent into a predetermined configuration. One preferred configuration is to bend the connecting terminals by a predetermined angle, e.g. by angle of approximately 90°.

The sensing section and the computing section preferably each have a substantially flat-plate like configuration.

Preferably, the sensor serves to detect the direction of the magnetic field that may correspond to the degree of opening of the throttle valve. By detecting the direction of the magnetic field, output signals from the sensor may not be substantially influenced by the positional displacement of the magnets, positional displacement of the throttle shaft, or by a change of strength of the magnetic field due to variations in temperature affecting the characteristics of the magnets. The positional displacements may be caused by a number of reasons, including error in mounting the throttle shaft and thermal expansion of a resin that may be molded with the magnets through an insert molding process. Therefore, the detection accuracy of the degree of opening of the throttle valve using a magnetic field direction sensor can be improved over a comparable magnetic strength sensor.

In another aspect of the present teachings, the throttle control device further includes a holder adapted to be mounted on a part of the throttle body, such as a removable cover of the throttle body. The sensor is mounted to the holder. If the part of the throttle body to which the detection device is mounted has been changed due to a change in the type of the throttle body, it is still possible to commonly use the holder having the sensor. In other words, the same holder and sensor can be used in a number of configurations.

In another aspect of the present teachings, the throttle control device may further include a positioning device that serves accurately position the holder. Therefore, the positioning device enables the determination of the position of the holder relative to a part of the throttle body through engagement therebetween. The assembling accuracy of the detection device can be improved through the use of a positioning device.

Preferably, the positioning device includes a positioning projection formed on one of the holder and the part of the throttle body and a positioning hole formed on the other of the holder and the part of the throttle body. The positioning hole should be engageable with the positioning projection. Other configurations are also included within the scope of a positioning device, including a notch and projection, semi-circle cylinder and corresponding semi-circle cavity, recessed cavity adapted to fit the body shape of the holder, and other positioning devices or techniques known to those skilled in the art.

In another aspect of the present teachings, the sensor is disposed within the holder. The sensor is fixed in position relative to the holder by a potting resin inserted into the holder. The potting resin filler reliably protects the sensor from most external forces that may be applied during typical transportation of the sensor. Preferably, the holder has a hollow configuration with a bottom and the sensor is disposed within the holder such that the sensing section substantially contacts or corresponds to the bottom of the holder. The sensing section may lie upon the bottom of the holder in a surface-to-surface contact relation therewith.

Alternatively, the sensor may be fixed in position relative to the holder by an insert molding process of the holder. During the resin molding of the holder, a previously inserted sensor may be held in pace by the molding material. With this arrangement, the sensor also may be reliably protected from potential external forces.

In another aspect of the present teachings, throttle control devices are taught that include a throttle body. An intake air channel is defined within the throttle body. A throttle valve is mounted to a throttle shaft and is disposed within the intake air channel. A motor is coupled to the throttle shaft. As the motor is driven the throttle valve rotates to open and close the intake air channel so as to control a flow rate of intake air through the intake air channel. A detection device detects a degree of opening of the throttle valve and includes a pair of magnets, a sensor, a printed circuit board, and a holder. The magnets are mounted to the throttle shaft and are positioned to oppose each other with respect to the rotational axis of the throttle shaft in order to produce a magnetic field. The sensor is mounted to the throttle body and serves to detect the characteristics of the magnetic field, preferably the direction of the magnetic field. The printed circuit board is electrically connected to the sensor via first terminals. The sensor and the printed circuit board are mounted to the holder to form a sensor assembly that is mounted to a part of the throttle body, such as a removable cover.

Because the sensor and the printed circuit board are mounted to the holder to form the sensor assembly, the sensor assembly can be commonly mounted to various types and parts of the throttle body. The mounting ability of the sensor assembly is retained even if the part of the throttle body to which the detection device is normally mounted has been changed due to a change in the type of the throttle body. As a result, limitations to the development of different types of parts of the throttle body may be reduced or eliminated. A wide variety of configurations are potentially possible with the separate mounting ability of the detection device.

In another aspect of the present teachings, the detection device further includes second terminals that are electrically connected to the printed circuit board. The second terminals are used for connecting to corresponding external terminals via the terminal ends of the second terminals. The terminal ends of the second terminals are preferably oriented in one direction and arranged in a predetermined order. The detection device is configured to permit the change of at least one of, the orienting direction of the terminal ends, and the rotational direction of the motor, without changing a predetermined order of the terminal ends of the second terminals. A common external connector may be used among different types of applications, as long as the external connector may receive the terminal ends of the throttle device in a predetermined order. In other words, an external connector can be commonly used for connection with different types of throttle control devices.

Preferably, the printed circuit board has a wiring pattern that is configured to enable the changing of the motor related connecting points of the second terminals in order to change the direction of rotation of the motor, without changing the order of the terminal ends of the second terminals. In other words, the circuit board should be designed with enough space to allow for multiple configurations of the connecting points of the second terminals. In addition, the circuit board should also have enough space to allow for different configurations accommodating at least two orientations of the terminal ends of the second terminals.

In another aspect of the present teachings, throttle control devices are taught that include a throttle body. An intake air channel is defined within the throttle body. A throttle valve is mounted to a throttle shaft and is disposed within the intake air channel. A motor is coupled to the throttle shaft. As the motor is driven the throttle valve rotates to open and close the intake air channel so as to control flow rate of intake air through the intake air channel. A detection device detects a degree of opening of the throttle valve and includes a pair of magnets, a sensor, a printed circuit board, and capacitors. The magnets are mounted to the throttle shaft and are positioned to oppose each other with respect to the rotational axis of the throttle shaft in order to produce a magnetic field. The sensor is mounted to the throttle body and serves to detect the magnetic field, preferably the direction of the magnetic field. The printed circuit board is electrically connected to the sensor via first terminals. The first terminals include an input terminal, an output terminal, and a ground terminal. The capacitors are electrically connected between the ground terminal and the various input and output terminals. The capacitors are mounted on the printed circuit board.

Because the capacitors are mounted on the printed circuit board, it is not necessary to design and wire circuit lines that three-dimensionally intersect to interconnect the ground terminal and the input and output terminals via the capacitors. Therefore, the manufacturing cost may be reduced and the operational reliability of the detecting device may be improved.

Preferably, the detection device further includes second terminals electrically connected to the printed circuit board for connecting to corresponding external terminals. The terminal ends of the second terminals will connect directly to the corresponding external terminals of the external connector.

In another aspect of the present teachings, second terminals are integrated with a part of the throttle body, which part is molded by a resin. The sensor and the printed circuit board are assembled into a sensor assembly that is mounted to the resin molded part of the throttle body.

Therefore, the second terminals can be accurately positioned in their respective predetermined positions. In addition, because the sensor and the printed circuit board are assembled into a sensor assembly that is mounted to the resin molded part of the throttle body, the operation for manufacturing the sensor assembly and the operation for mounting the sensor assembly to the resin molded part of the throttle body can be performed at different production sites.

BRIEF DESCRIPTION OF THE DRAWINGS

FIG. 18 is a plan view of the holder; and FIG. 19 is a front view of a sensor IC; and FIG. 20 is a side view of the sensor IC.

DETAILED DESCRIPTION OF THE INVENTION

Each of the additional features and teachings disclosed above and below may be utilized separately or in conjunction with other features and teachings to provide improved throttle control devices and methods of using such improved throttle control devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
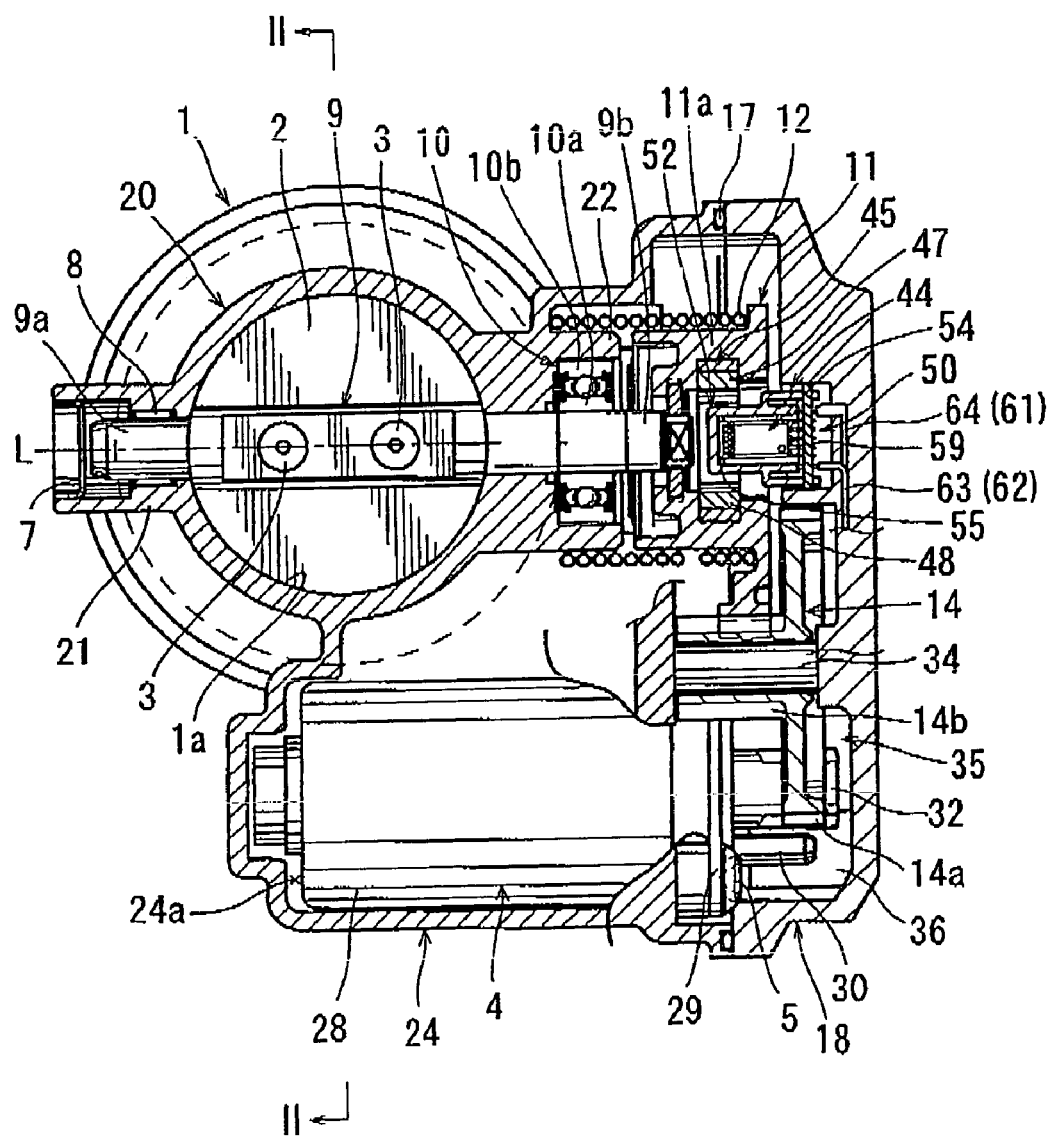
FIG. 1 is a sectional plan view of a representative throttle control device.
Figure 2:
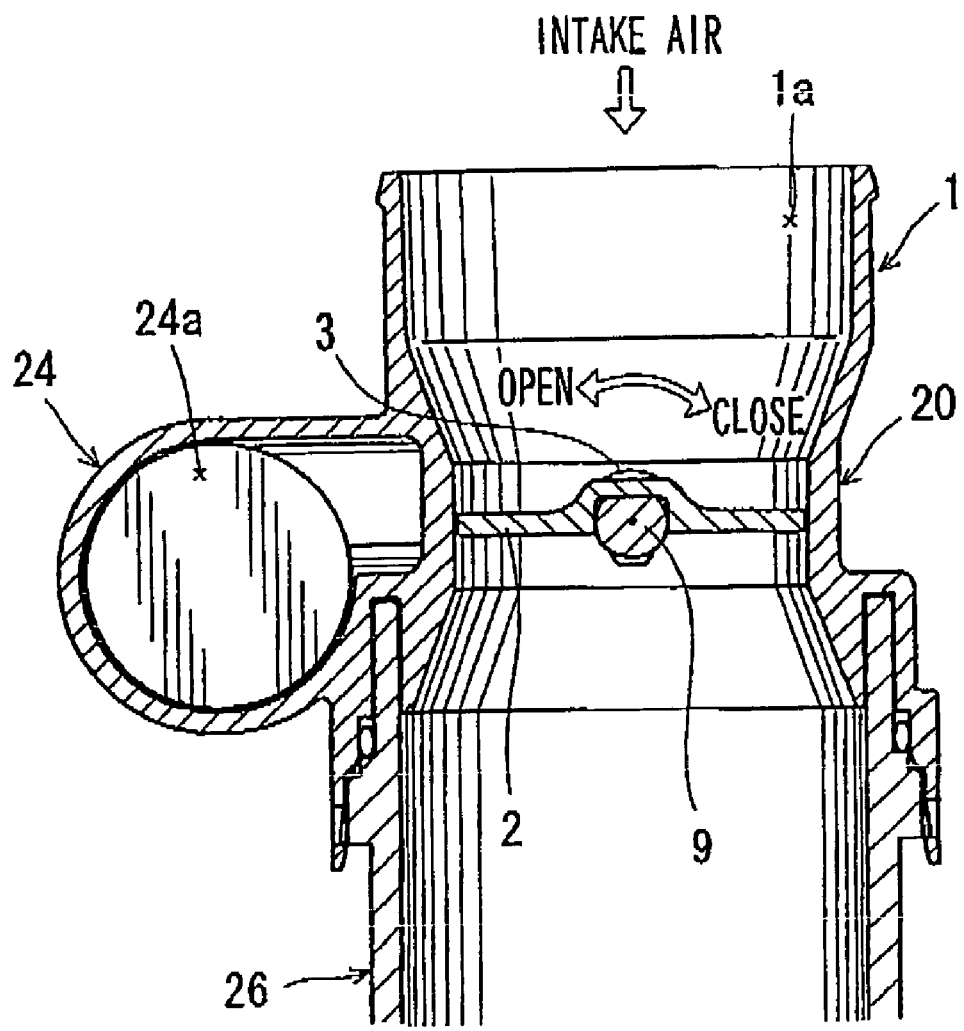
FIG. 2 is a cross sectional view taken along line II—II in FIG. 1.

A representative embodiment will now be described with reference to the drawings. First, the construction of a representative throttle control valve will be described in brief. Referring to FIGS. 1 and 2, the throttle control valve includes a throttle body 1 that may be made of resin, such as PBT. The throttle body 1 has a bore portion 20 and a motor housing portion 24, that are formed integrally with one another. As shown in FIG. 1, a substantially cylindrical intake air channel 1a is formed in the bore portion 20 and extends vertically through the bore portion 20, as viewed in FIG. 2. An air cleaner (not shown) may be connected to the upper part of the bore portion 20. An intake manifold 26 is connected to the lower part of the bore portion 20. In the drawings, only a connecting portion of the manifold 26 is shown. A metal throttle shaft 9 is disposed within the bore portion 20 and extends across the intake air channel 1a in the diametrical direction.

As shown in FIG. 1, left and right support portions, 21 and 22, rotatably support the throttle shaft 9 via respective left and right bearings, 8 and 10. The support portions, 21 and 22, are formed integrally with the bore portion 20 of the throttle body 1. Preferably, the left bearing 8 is a thrust bearing and the right bearing 10 is a radial ball bearing. The throttle shaft 9 is press fitted into an inner race 10a of the right bearing 10. The outer race 10b of the right bearing 10 is fitted with clearance into the support portion 22 of the resin throttle body 1. The loose fitting of the outer race 10b has been incorporated in order to avoid the cracking of the support portion 22. The dimensional tolerance of the diameter of the inner peripheral surface of the support portion 22 is relatively large because the throttle body 1 is made of resin. In addition, the thermal linear expansion coefficient of the support portion 22 is considerably different from that of the bearing 10. Therefore, when the outer race 10b has been press fitted into the support portion 22, the press-fitting force may possibly crack the support portion 22. On the other hand, in the case where the throttle body 1 is made of a metal, such as aluminum alloy for example, the inner peripheral surface of the support portion 22 may be machined (cut) to within a relatively small dimensional tolerance. The metal throttle body 1 may also have a relatively small difference in the thermal linear expansion coefficients between the support portion 22 and the bearing 10. Therefore, in such a case, the outer race 10b may be press fitted into the support portion 22 without causing any cracking problem.

As shown in FIG. 1, a throttle valve 2, made of resin, is secured to the throttle shaft 9 by rivets 3. The throttle valve 2 is adapted to open and close the intake air channel 1a (see FIG. 2) as the throttle valve 2 rotates with the throttle shaft 9. The motor 4 rotatably drives the throttle shaft 9 so that the throttle valve 2 rotates to incrementally open and close the intake air channel 1a. The throttle valve 2 rotates in order to control the flow rate of the intake air within the intake air channel 1a. In the state shown FIG. 2, the throttle valve 2 is in a fully closed position. The throttle valve 2 may rotate in a counterclockwise direction as viewed in FIG. 2 ("Open" direction as indicated by an arrow shown in FIG. 2) to open the intake air channel 1a.

As shown in FIG. 1, a plug 7 is fitted into the support portion 21 that forms a first end 9a (left end as viewed in FIG. 1) of the throttle shaft 9. The plug 7 serves to seal the first end 9a within the bore portion 20. A second end 9b (right end as viewed in FIG. 1) of the throttle shaft 9 extends through the support portion 22. A throttle gear 11 is secured to the second end 9b and does not rotate relative to the throttle shaft 9. The throttle gear 11 is made of resin and is configured as a sector gear. A return spring 12 is interposed between the throttle body 1 and the throttle gear 11 in order to normally bias the throttle valve 2 toward the fully closed position. Although not shown in the drawings, a stopper device is provided between the throttle body 1 and the throttle gear 11 in order to prevent the throttle valve 2 from rotating further beyond the fully closed position.

As shown in FIG. 1, the motor housing portion 24 of the throttle body 1 is configured as a bottomed hollow cylindrical member that has a central axis parallel to a rotational axis L of the throttle shaft 9. As shown in FIG. 2, a motor accommodating space 24*a* is defined within the motor housing portion 24 and is open on a right side, as viewed in FIG. 1. The motor 4 is inserted into the motor accommodating space 24*a*. For example, the motor 4 may be a DC motor. In the accommodated state, the motor 4 is positioned such that the longitudinal axis of the motor 4 extends substantially parallel to the rotational axis L of the throttle shaft 9. The output shaft 4*a* (see FIG. 3) of the motor 4 is oriented rightward, as viewed in FIG. 1 (i.e., a direction opposite to the insertion direction of the motor 4 into the motor accommodating space 24*a*). As also shown in FIG. 1, a mount flange 29 is formed on the right end (the end opposite to the motor insertion direction) of a motor casing 28, i.e., an outer hull, of the motor 4. The mount flange 29 is secured to the motor housing portion 24, by means of screws 5 for example.

Figure 3:
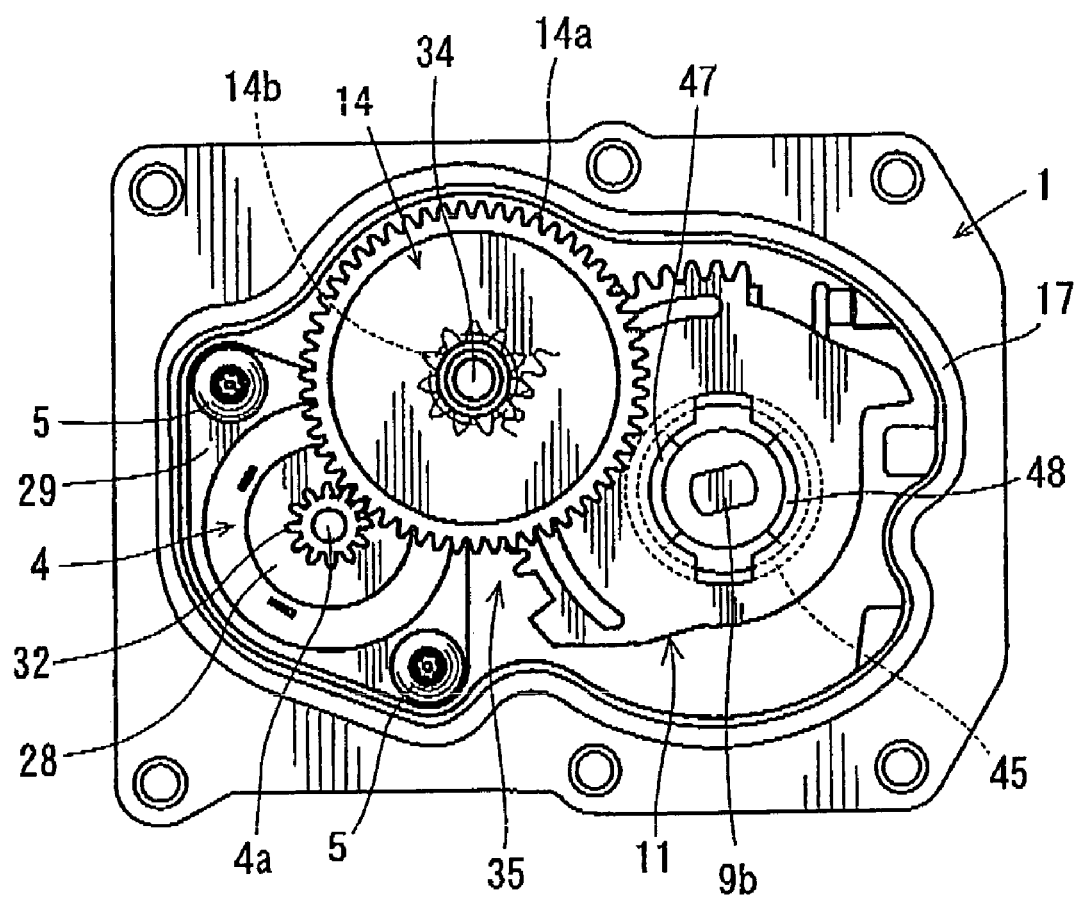
FIG. 3 is a side view of the throttle control device with a cover removed.

As shown in FIG. 3, a motor pinion 32 is secured to the output shaft 4*a* of the motor 4. The motor pinion 32 may be made of resin. As shown in FIG. 1, a countershaft 34 is mounted to the throttle body 1 in a position between the bore portion 20 and the motor housing portion 24. The countershaft 34 extends parallel to the rotational axis L of the throttle shaft 9, and the axis of the motor output shaft 4*a*. A counter gear 14, made of resin, is rotatably supported on the countershaft 34. The counter gear 14 includes a first gear portion 14*a* and a second gear portion 14b, having different outer diameters from one another. The first gear portion 14*a*, having a relatively larger outer diameter, engages the motor pinion 32. The second gear portion 14b, having a smaller outer diameter, engages the throttle gear 11 (see FIG. 3). The motor pinion 32 and the counter gear 14 constitute a speed reduction gear mechanism 35.

As shown in FIG. 1, a cover 18 made of resin, such as PBT, is mounted to the right side of the throttle body 1 in order to cover the reduction gear mechanism 35 and other associated mechanisms from the outside. The cover 18 may be fixed in position relative to the throttle body 1 by an appropriate mounting device or fixing device, for example, such as a screw device. An O-ring 17 is interposed between the throttle body 1 and the cover 18 in order to provide a hermetic seal therebetween. In this way, the cover 18 may serve as a component of the throttle body 1. Two motor terminals 30 (only one terminal 30 is shown in FIG. 1) extend from the mount flange 29 of the motor 4 and are electrically connected to respective relay connectors 36, mounted to the cover 18.

Figure 7:
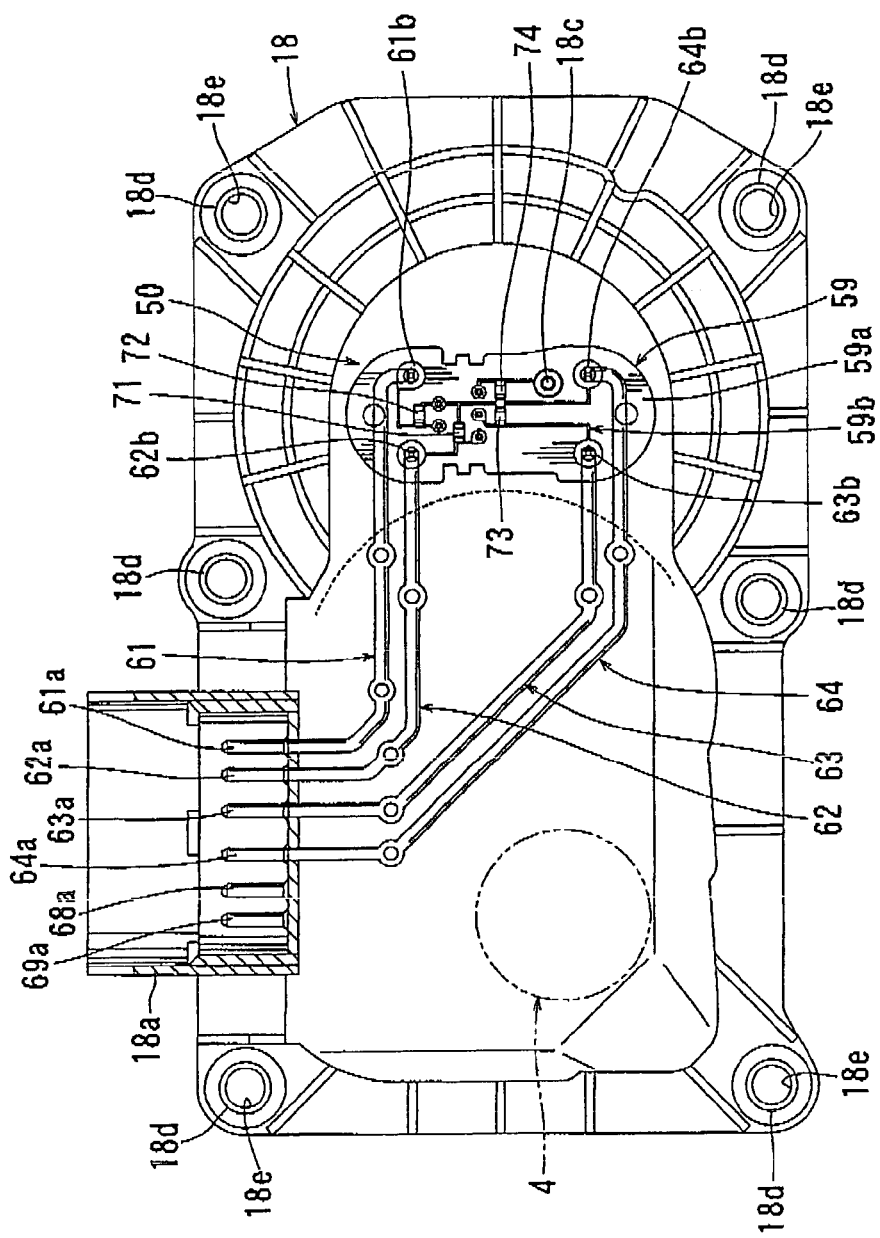
FIG. 7 is a side view as viewed from an outer side of the cover, with a portion shown in a sectional view.
Figure 8:
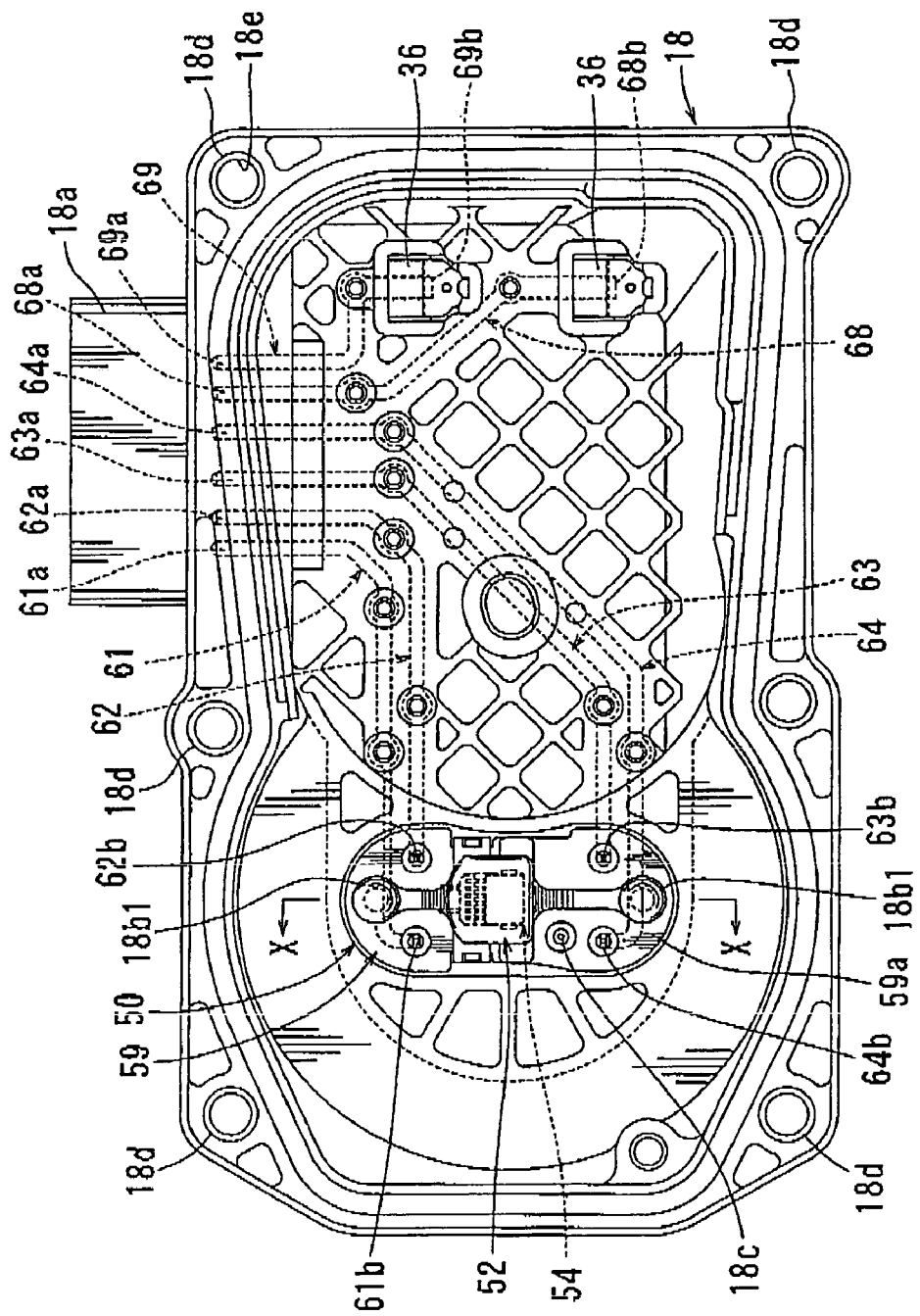
FIG. 8 is a side view as viewed from an inner side of the cover.
Figure 25:
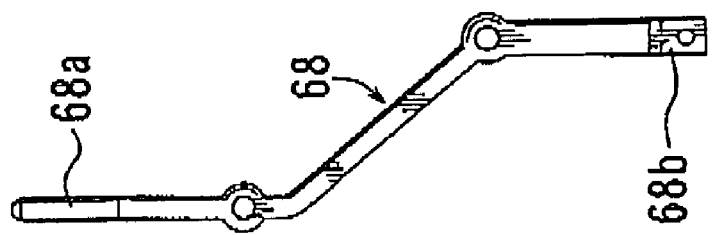
FIG. 25 is a front view of a first motor terminal.
Figure 26:
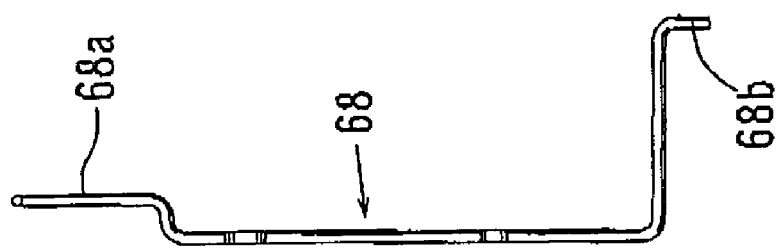
FIG. 26 is a side view of the first motor terminal.
Figure 27:
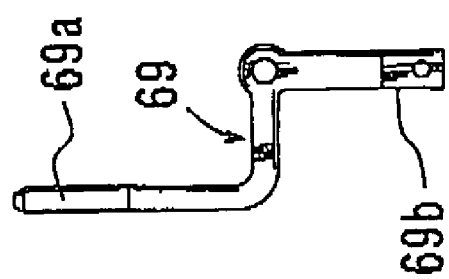
FIG. 27 is a front view of a second motor terminal.
Figure 28:
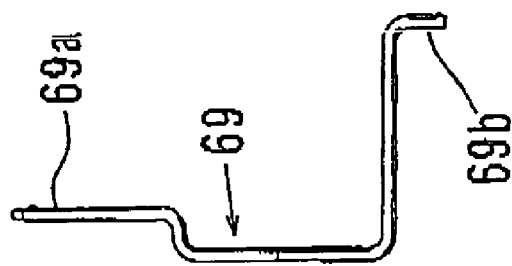
FIG. 28 is a side view of the second motor terminal.

As shown in FIG. 8, a first terminal end 68*b* of a first motor terminal 68 (detailed in FIGS. 25 and 26) and a first terminal end 69*b* of a second motor terminal 69 (detailed in FIGS. 27 and 28) are electrically connected to the respective relay connectors 36. The first and second motor terminals, 68 and 69, are integrated with the cover 18 via the insert molding process of the cover 18. A second terminal end 68*a* of the first motor terminal 68 and a second terminal end 69*a* of the second motor terminal 69 are configured as external connecting ends. The second terminal ends 68*a* and 69*a* protrude vertically upward into a substantially rectangular connector portion 18*a* formed on the upper portion of the cover 18 (see FIGS. 7 to 9). The connector portion 18*a* is adapted to be connected to an external connector (not shown). The external connector has external terminals for electrically connecting with the respective second terminal ends 68*a* and 68*a*. A press forming process may preferably form the first and second motor terminals, 68 and 69. The outer surfaces of the first and second terminals 68 and 69 may be Cu—Zn plated.

The motor 4 may be controlled based on signals from a control unit, such as an ECU (engine control unit), of an internal combustion engine of an automobile. The control unit may output signals to the motor 4 in order to control the degree of opening of the throttle valve 2. For example, the output signals may include an accelerator signal corresponding to the amount of depression of an accelerator pedal, a traction control signal, a constant-speed travelling signal, and an idling speed control signal. The rotation or the driving force of the motor 4 may be transmitted to the throttle shaft 9 via the reduction gear mechanism 35 (i.e., the motor pinion 32 and the counter gear 14) and the throttle gear 11.

As shown in FIG. 1, the throttle gear 11 has a substantially cylindrical tubular portion 11*a* that is positioned to extend rightward of the right end surface of the throttle shaft 9. The tubular portion 11*a* has the same axis as the rotational axis L of the throttle shaft 9. A yoke 45 is formed integrally with the inner peripheral surface of the tubular portion 11*a* through an insertion molding process of the tubular portion 11*a*. The yoke 45 is made of magnetic material and has a ring-shaped configuration substantially about the rotational axis L of the throttle shaft 9. A pair of magnets 47 and 48 (permanent magnets) is attached to the inner peripheral surface of the yoke 45. Magnets 47 and 48 are positioned to symmetrically oppose each other with respect to the rotational axis L. The magnets 47 and 48 may also be integrated with the tubular portion 11*a* and the yoke 45 during the insert molding process of the tubular portion 11*a*. Therefore, the yoke 45 and the magnets 47 and 48 are embedded within the resin of the tubular portion 11*a* in such a way that essentially only the inner peripheral surfaces of the magnets 47 and 48 are exposed to or communicate with the inside of the tubular portion 11*a*. In this way, throttle gear 11 serves as a support means for supporting the yoke 45 and the magnets 47 and 48.

As shown in FIG. 7, four electrically conductive terminals 61, 62, 63, and 64, are integrated with the cover 18 through the insert molding process of the cover 18. The terminals 61, 62, 63, and 64, respectively serve as a signal output terminal (V1), a signal input terminal (Vc), a signal output terminal (V2), and a ground terminal (E2). The terminals 61, 62, 63, and 64 have respective first terminal ends 61*b*, 62*b*, 63*b* and 64*b*. The first terminal ends 61*b*, 62*b*, 63*b*, and 64*b* are respectively inserted into large diameter through-holes 59*d*1, 59*d*2, 59*d*3, and 59*d*4, formed in a printed circuit board 59 (see FIGS. 21 and 22) so as to be electrically connected to the inner walls thereof. To this end, the terminals 61 to 64 are integrated with the cover 18 such that the first terminal ends, 61*b* to 64*b*, are exposed to the inside of the cover at predetermined positions (see FIGS. 11 and 12).

Figure 10:
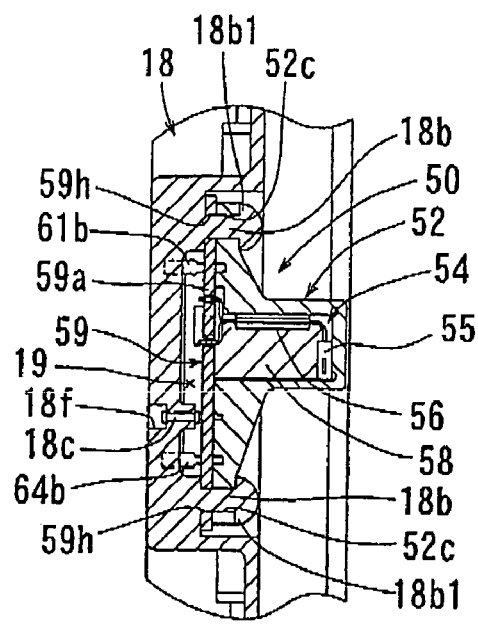
FIG. 10 is a cross sectional view taken along line X—X in FIG. 8.
Figure 11:
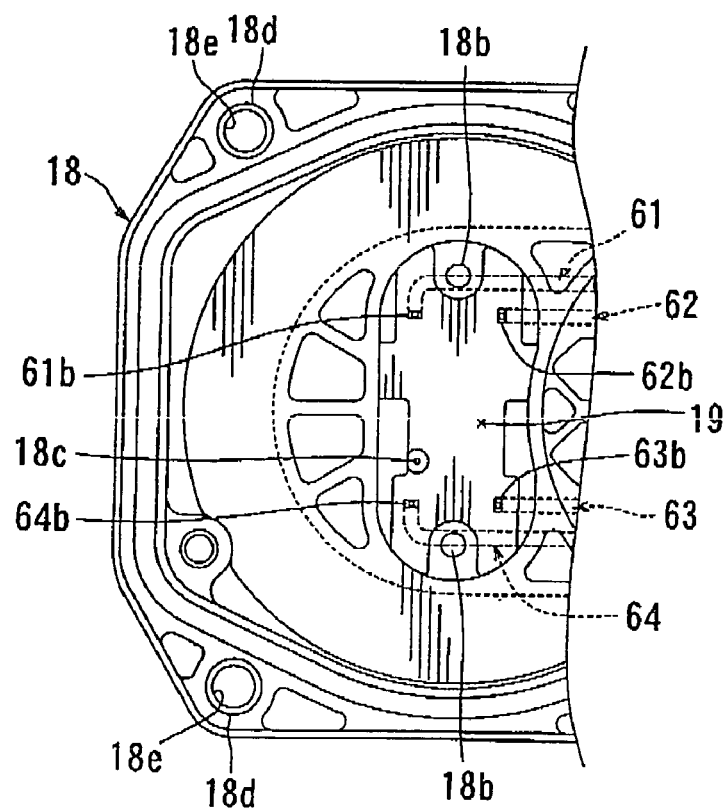
FIG. 11 is a side as viewed from the inner side of a part of the cover and showing the state before a sensor assembly is mounted to the cover.
Figure 12:
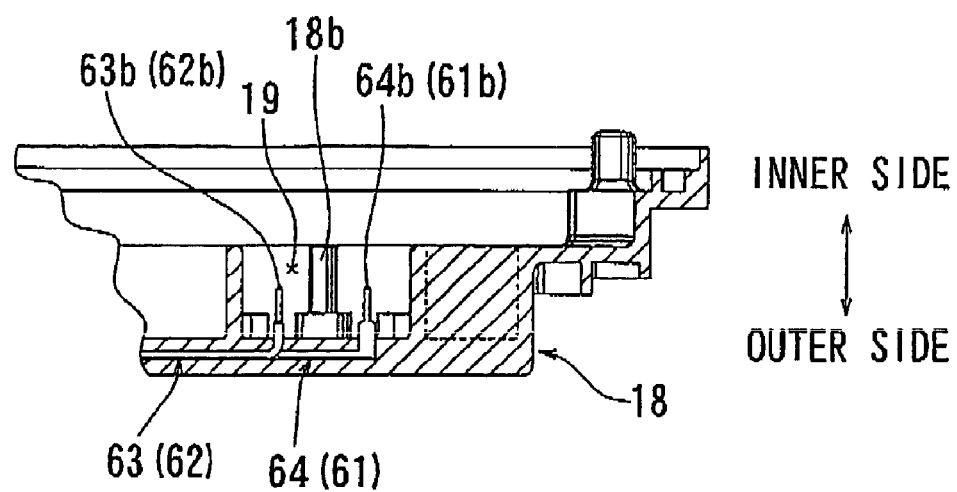
FIG. 12 is a plan view of a part of the cover, which a part shown in a sectional view, and showing the state before the sensor assembly is mounted to the cover.

As shown in FIGS. 11 and 12, a pair of pin-like positioning projections 18*b* extends from the inner surface of the cover 18. The positioning projections 18*b* are spaced vertically from each other as viewed in FIG. 11. In addition, a terminal pin 18*c* is integrated with the cover 18 through the insert molding process. Terminal pin 18*c* is positioned on the same axis as through hole 59*d*5 (see FIGS. 21 and 22) formed in the printed circuit board 59. The inner end (right end as viewed in FIG. 10) of the terminal pin 18*c* extends from the inner wall of the cover 18. The outer end (left end as viewed in FIG. 10) extends into a recess 18f, formed in the outer wall of the cover 18. In addition, a plurality of metal collars 18d (six collars 18d are provided in this representative embodiment) are integrated with the peripheral portion of the cover 18 through the insert molding process. The metal collars 18d have screw insertion holes 18e formed therein for receiving screws (not shown). The screws are adapted to secure the cover 18 to the throttle body 1 (see FIG. 1).

Figure 9:
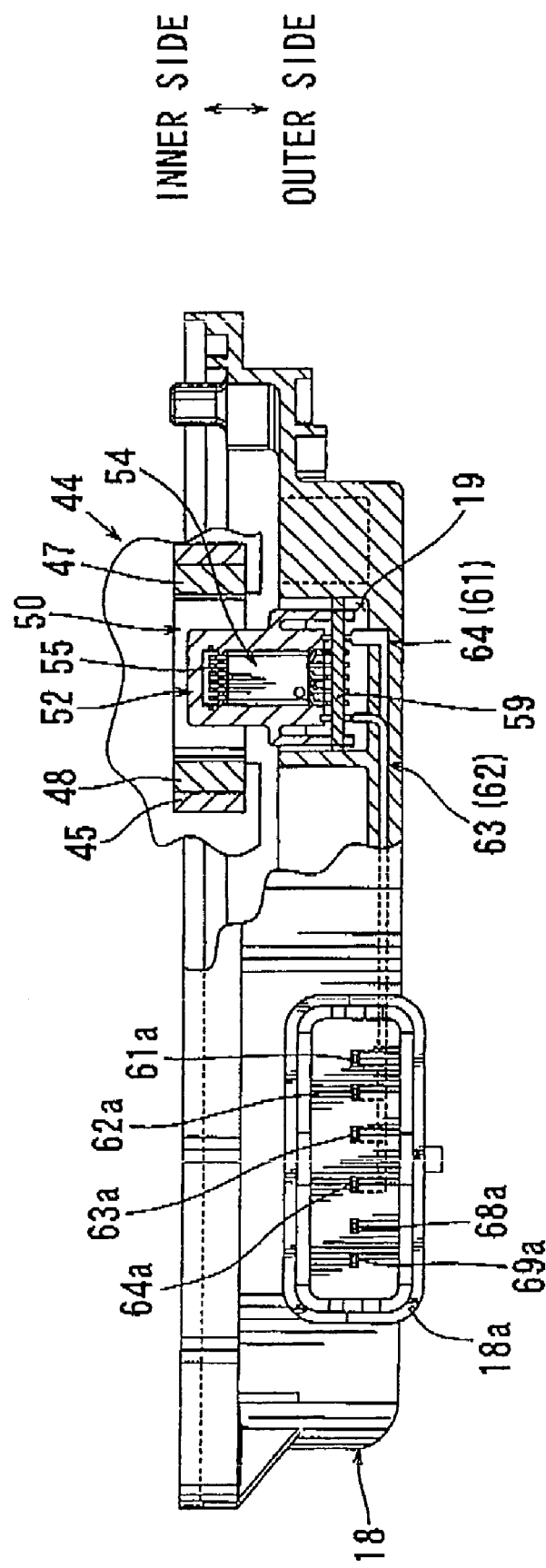
FIG. 9 is a plan view of the cover, with a part shown in a sectional view.

As shown in FIG. 7, the terminals, 61, 62, 63, and 64, have respective second terminal ends, 61a, 62a, 63a, and 64a, which extend vertically upward into the connector portion 18a of the cover 18. The second terminal ends, 61a, 62a, 63a, and 64a, serve as external connecting ends. As shown in FIGS. 7 and 9, the second terminal ends, 61a, 62a, 63a, and 64a, are arranged along a row in a predetermined order and in predetermined intervals together with the second terminal ends, 68a and 69a, of the motor terminals, 68 and 69. All of the second terminal ends, 61a–64a, 68a, and 69a, are adapted to be electrically connected to the corresponding external terminals of the external connector. As shown in FIGS. 7 and 9, the second terminal ends, 61a, 62a, 63a, 64a, 68a, and 69a, are arranged in this order from left to right as viewed in FIG. 7.

Among the various integrated terminals, the signal output terminal (V1), terminal 61, is positioned the farthest away from the motor 4. This arrangement minimizes the influence of noise generated by the motor 4 upon the terminal 61.

Figure 23:
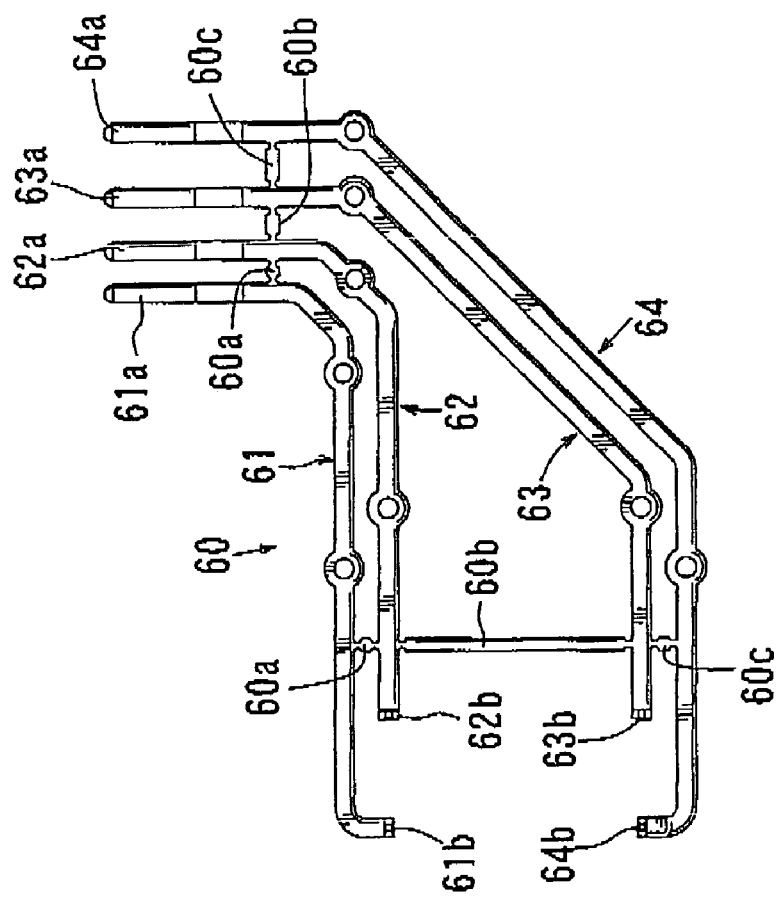
FIG. 23 is a rear view of terminal unit.
Figure 24:
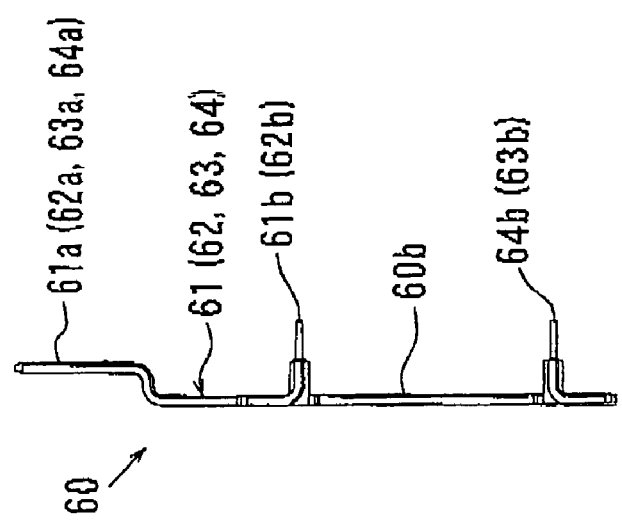
FIG. 24 is a side view of the terminal unit.

As shown in FIG. 23, all of the terminals, 61 to 64, may be formed as a terminal unit 60 before being integrally molded with the cover 18. In the terminal unit 60, the two adjoining terminals 61 and 62 are joined to each other via joints 60a at both ends. The two adjoining terminals 62 and 63 are joined to each other via joints 60b at both ends. And the two adjoining terminals 63 and 64 are joined to each other via joints 60c at both ends. When the terminals 61 to 64 are molded with the cover 18, the joints 60a, 60b, and 60c, are cut and removed, so that the terminals 61 to 64 are separated and electrically separated from each other as individual terminals. Preferably, a press forming operation may form the terminal unit 60. In addition, the terminals 61 to 64 may generally be plated with Ni. However, the second terminal ends, 61a, 62a, 63a, and 64a, may be plated with Au.

Figure 16:
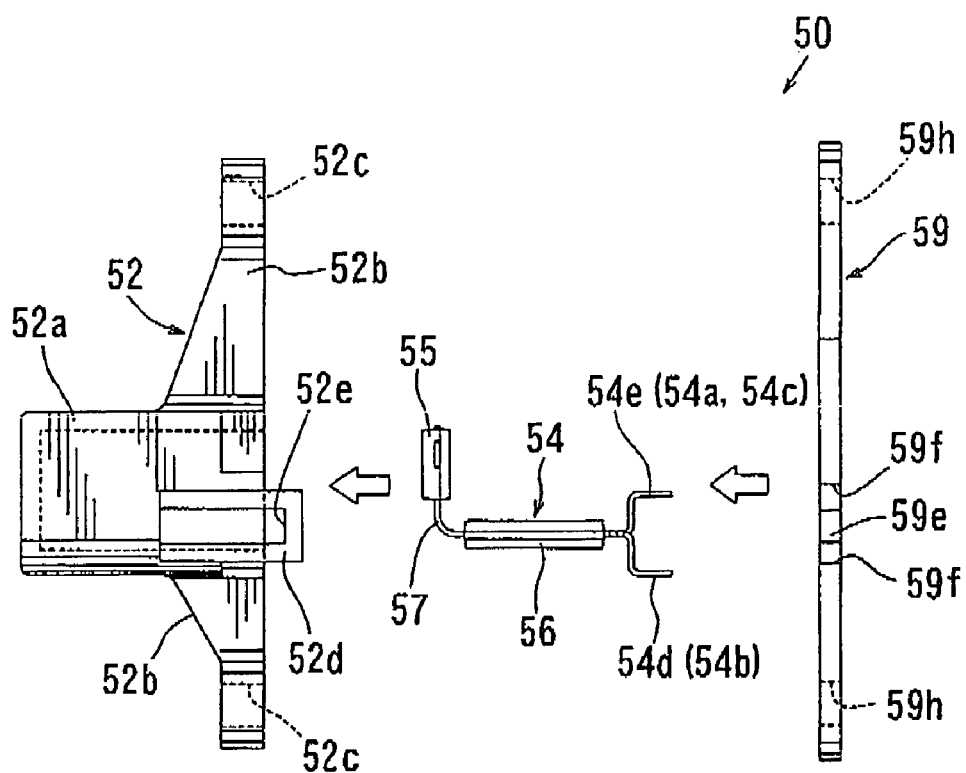
FIG. 16 is an exploded side view of the sensor assembly.

A sensor assembly 50 is disposed inside of the cover 18 and is positioned opposing the right end of the throttle shaft 9, as shown in FIG. 1. As shown in FIG. 16, the sensor assembly 50 includes a holder 52, a sensor IC 54, and a circuit board 59. The yoke 45, the magnets, 47 and 48, and the sensor assembly 50, constitute a detection device 44 (see FIG. 1) that may serve as a throttle sensor.

Figure 17:
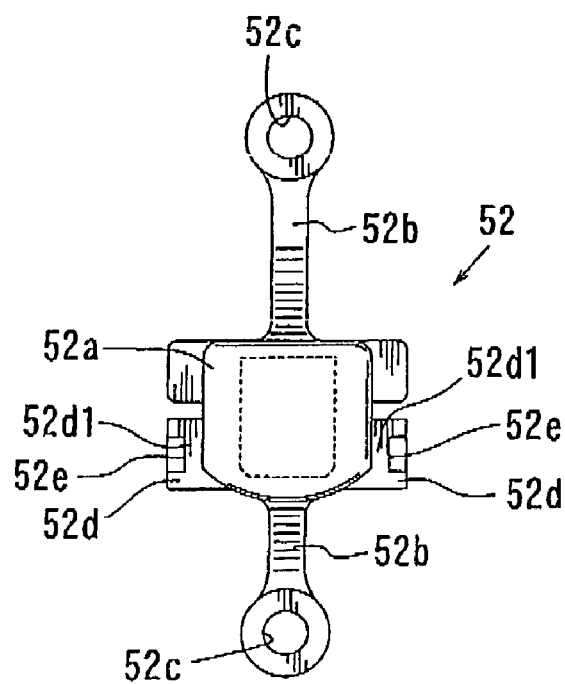
FIG. 17 is a front view of a holder.

As shown in FIGS. 16, 17, and 18, the holder 52 has a bottomed tubular portion 52a and is preferably made of resin. Upper and lower mount pieces 52b are formed integrally with the open end of the tubular portion 52a. The mount pieces 52b extend vertically (as seen in FIGS. 16 and 17), in opposite directions to one another, from the open end of the tubular portion 52a. Positioning holes 52c are formed in the end portions of the mount pieces 52b. In addition, left and right (FIG. 17) snap fit portions 52d are formed integrally with the open end of the tubular portion 52a and extend horizontally (FIG. 16) therefrom in the right direction. As shown in FIG. 18, each of the snap fit portions 52d has a base portion 52d1 that extends laterally outward from the outer surface of the tubular portion 52a by a predetermined distance. In addition, each of the snap fit portions 52d can be resiliently deformed so as to increase the distance between the snap fit portions 52b, as indicated by the two-dash lines in FIG. 18. Further, each of the snap fit portions 52d has an elongated engaging slot 52e, as shown in FIG. 16.

As shown in FIGS. 19 and 20, the sensor IC 54 includes a magnetic sensing section 55 and a computing section 56 that are arranged vertically. The sensing section 55 and the computing section 56 are mechanically and electrically connected to one another via a plurality of connecting terminals 57 (six connecting terminals 57 are provided in this representative embodiment). The sensing section 55 has a substantially rectangular plate-shaped configuration. The computing section 56 also has a rectangular plate-shaped configuration that is elongated in the vertical direction (the connecting direction to the sensing section 55). For example, the sensing section 55 may include a magnetic resistance element accommodated therein.

As noted above, the sensing section 55 has a substantially rectangular configuration and the sensing section 56 has a substantially elongated rectangular configuration. In addition, the sensing section 55 and the computing section 56 are connected in series with one another. As shown in FIG. 19, the computing section 56 has five parallel connecting terminals 54a, 54b, 54c, 54d, and 54e, arranged in this order from left to right as viewed in FIG. 19. The connecting terminals, 54a–54e, extend downwardly from the computing section 56. The first (rightmost in FIG. 19) connecting terminal 54a is configured as an input terminal. The second and third connecting terminals, 54b and 54c, are configured as output terminals. The fourth connecting terminal 54d is configured as a ground terminal. The fifth connecting terminal 54e is configured as a programming terminal, used for writing a marker value (i.e., an expected sensor output in the fully closed position of the throttle valve 2) into the sensor IC 54. The writeable marker value is required because the fully closed position may vary with different designs of the throttle body 1.

As indicated by two-dashed lines in FIG. 20, the connecting terminals 57 of the sensor IC 54 may be altered into various configurations. Preferably, in this embodiment the connecting terminals 57 are bent to have an L-shaped configuration. This causes the sensing section 55 to be inclined relative to the computing section 56. The angle of inclination is preferably substantially 90° (rightward as viewed in FIG. 20). At the same time, the first, third, and fifth connecting terminals, 54a, 54c, and 54e, are bent rearward (rightward as viewed in FIG. 20) and the second and fourth connecting terminals, 54b and 54d, are bent forward (leftward as viewed in FIG. 20) so as to be offset from the first, third and fifth connecting terminals, 54a, 54c, and 54e.

Figure 14:
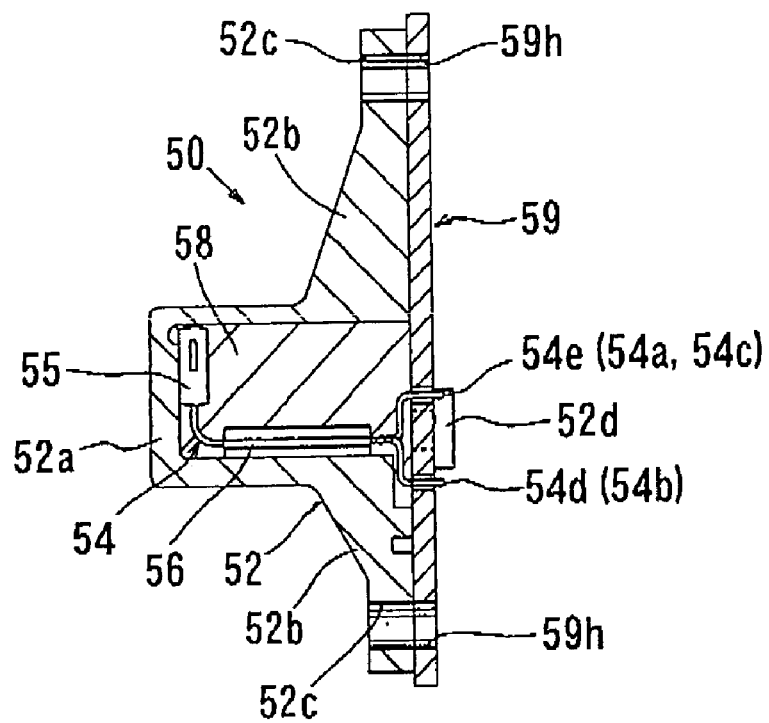
FIG. 14 a sectional side view of the sensor assembly.
Figure 15:
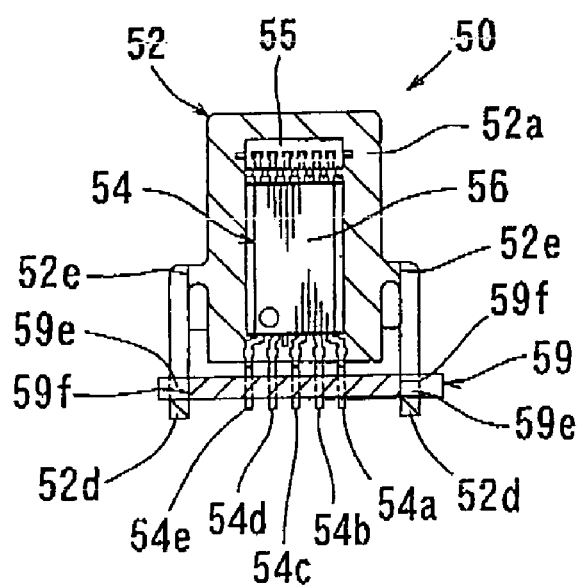
FIG. 15 is a sectional plan view of the sensor assembly.

As shown in FIGS. 14 and 15, the sensor IC 54 is disposed within the tubular portion 52a of the holder 52. A potting resin 58 (see FIG. 14), such as UV curable resin, may be filled within the tubular portion 52a, so that the sensing section 55 and the computing section 56 of the sensor IC 54 are embedded within the potting resin 58. The result of the potting resin 58 is to substantially fix the sensor IC 54 in position relative to the holder 52. In the embedded state, the sensing section 55 may contact the inner surface of the bottom of the holder 52, preferably in surface-to-surface contact relation therewith.

Figure 21:
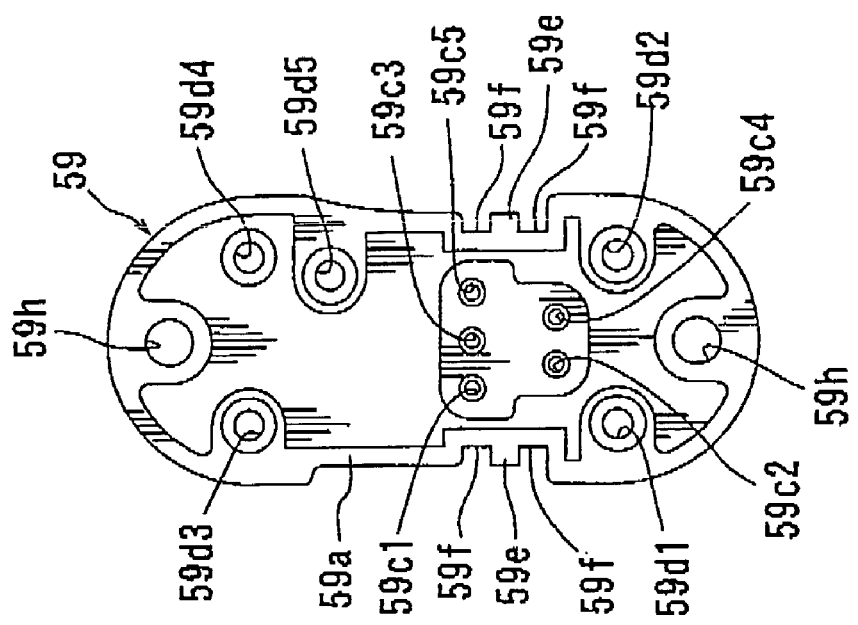
FIG. 21 is a front view of a printed circuit board.
Figure 22:
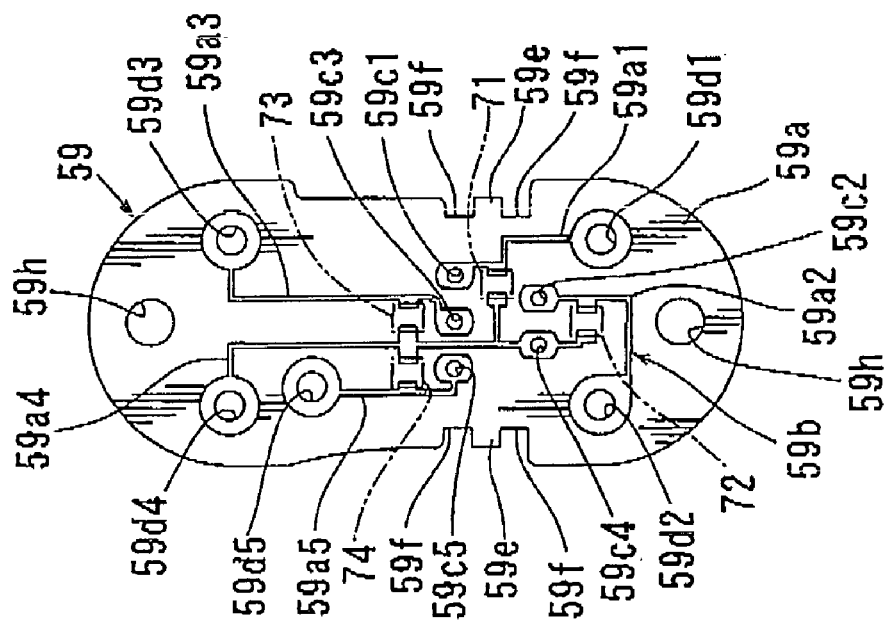
FIG. 22 is a rear view of the printed circuit board.

As shown in FIGS. 21 and 22, the printed circuit board 59 includes an insulation substrate 59a. The insulation substrate 59a is made of an insulation material having a substantially oval configuration. As shown in FIG. 22, a wiring pattern 59b, made of conductive material, is formed on one side of the base plate 59a. For the purpose of explanation, the surface on which the wiring pattern 59b is located may be hereinafter referred to as a rear surface (FIG. 22). The surface opposite to the rear surface is hereinafter referred to as a front surface (FIG. 21).

The printed circuit board 59 has small-diameter through holes 59c1, 59c2, 59c3, 59c4, and 59c5, that correspond to the sensor IC 54 connecting terminals 54a, 54b, 54c, 54d, and 54e, and are arranged in an alternating manner as shown in FIG. 22. Large-diameter through holes 59d1, 59d2, 59d3, and 59d4, are formed in the printed circuit board 59 at four corners of the wiring pattern 59b. In addition, through hole 59d5 is formed in the printed circuit 59 in a position adjacent to and below the upper right large-diameter through hole 59d4 (as seen in FIG. 21).

As shown in FIG. 22, the wiring pattern 59b has wiring lines 59a1, 59a2, 59a3, 59a4, and 59a5. The wiring line 59a1 electrically connects through hole 59c1 to the through hole 59d1. The wiring line 59a2 electrically connects through hole 59c2 to the through hole 59d2. The wiring line 59a3 electrically connects through hole 59c3 to the through hole 59d3. The wiring line 59a4 electrically connects through hole 59c4 to the through hole 59d4. And the wiring line 59a5 electrically connects through hole 59c5 to the through hole 59d5. In particular, the wiring line 59a4 extends down a narrow space located between through hole 59d3 and the through hole 59d5. Wiring line 59a4 is not directly electrically connected to either through hole, 59d3 or 59d5.

Capacitors 71, 72, 73, and 74, are respectively electrically connected between the wiring line 59a4, and the other wiring lines 59a1, 59a2, 59a3, and 59a5, by an appropriate bonding technique, such as an electrically conductive adhesive. In this way, the capacitors 71 to 74 are mounted to the printed circuit board 59 and may serve to possibly prevent or limit the exposure of the sensor IC 54 to applications of high voltage, for example, due to electrostatic charge.

As shown in FIGS. 21 and 22, engaging projections 59e formed on two sides (left and right sides) of the printed circuit board 59. Upper and lower recesses 59f, formed on upper and lower sides of each engaging projection 59e, further define the engaging projections 59e. A pair of positioning holes 59h are formed in upper and lower ends of the printed circuit board 59. The positioning holes 59h are located so as to align with corresponding positioning holes 52c, formed in the holder 52. Preferably, both of the front and rear surfaces of the printed circuit board 59 are coated with an appropriate moisture-proof coating material (not shown).

Figure 13:
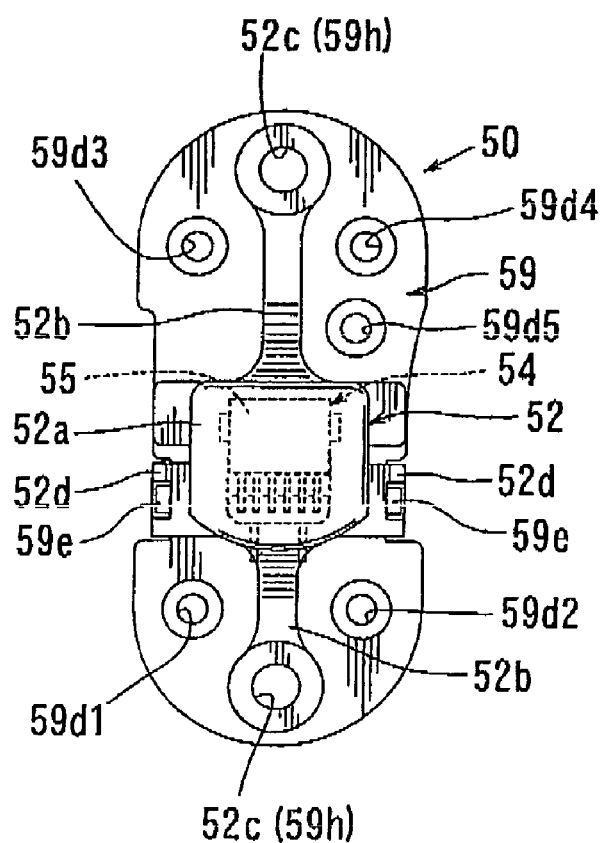
FIG. 13 is a front view of the sensor assembly.

The printed circuit board 59 may be fitted to the holder 52, as shown in FIGS. 13 to 15, by utilizing the snap-fit function ability of the resilient deformation of the snap-fit portions 52d, as indicated by two-dashed chain lines in FIG. 18. The snap-fit portions 52d may be resiliently deformed so that the bottom surfaces (lower surface as viewed in FIG. 18) of the snap-fit portions 52 contacts the outer front side surfaces of the printed circuit board. Each snap-fit portion 52d may then engage the corresponding upper and lower recesses 59f (see FIGS. 21 and 22) of the printed circuit board 59 so as to receive an engaging projection 59e of the circuit board 59 in an engaging slot 52e (see FIGS. 13 and 15). In this way, the printed circuit board 59 is fitted to the holder 52 and the printed circuit board 59 can be fixed in position relative to the holder 52. Because of the snap-fit functioning of the snap-fit portions 52d of the holder 52, the fitting operation of the printed circuit board 59 may be performed relatively easily.

During the operation of fitting the printed circuit board 59 to the holder 52, the first to fifth connecting terminals, 54a, 54b, 54c, 54d, and 54e, are respectively inserted into the through holes, 59c1, 59c2, 59c3, 59c4, and 59c5 (see FIG. 21), and may be electrically connected thereto by soldering (see FIG. 15). In addition, the positioning holes 59h of the printed circuit board 59 are brought in alignment with the positioning holes 52c of the holder 52.

The sensor assembly 50 may thus be completed by fitting the printed circuit board 59 to the holder 52 so that has the sensor IC 54 is disposed therein (see FIGS. 13 to 15). The sensor assembly 50 may then be positioned relative to the cover 18 such that the printed circuit board 59 opposes the inner surface of the cover 18. As shown in FIG. 10, the positioning holes 52c and 59h are engaged by the corresponding positioning projections 18b formed on the inner wall of the cover 18. The front ends of the positioning projections 18b may then be heated and crushed or deformed into a configuration similar to 18b1. In this way, the sensor assembly 50 can be fixed in position relative to the cover 18. During the mounting operation of the sensor assembly 50, the sensor assembly 50 is rotated 180° from the position shown in FIG. 13. As described above, the positioning projections 18b of the cover 18 and the positioning holes 52c and 59h of the sensor assembly 50 constitute a positioning device for locating the position of the sensor assembly 50 relative to the cover 18.

During the mounting assembly of sensor assembly 50 to the cover 18, the first terminal end 61b of terminal 61 (signal output terminal)(see FIG. 11) integrally molded with the cover 18, may be inserted into the through hole 59d2 (see FIG. 13) of the printed circuit board 59. Soldering may fix an electrical connection of the first terminal end 61b to the inner wall of the through hole 59d2. Similarly, the first terminal end 62b of the terminal 62 (signal input terminal) (see FIG. 1) may be inserted into the through hole 59d1 (see FIG. 13) of the printed circuit board 59 so as to be electrically connected to the inner wall of the through hole 59d1. The first terminal end 63b of the terminal 63 (signal output terminal) (see FIG. 11) may be inserted into the through hole 59d3 (see FIG. 13) of the printed circuit board 59 so as to be electrically connected to the inner wall of the through hole 59d3. The first terminal end 64b of the terminal 64 (ground terminal) (see FIG. 1) may be inserted into the through hole 59d4 (see FIG. 13) of the printed circuit board 59 so as to be electrically connected to the inner wall of the through hole 59d4. In addition, the inner end of the terminal pin 18c (FIG. 10) may be inserted into the through hole 59d5 (see FIG. 13) of the printed circuit board 59 so as to be electrically connected to the inner wall of the through hole 59d5. Soldering may fix electrical connections between all of the terminals and through holes previously mentioned. A potting resin (not shown) may be applied so as to cover and/or seal the printed circuit board 59 in the mounted state on the cover 18. The potting resin (not shown) or similar substance may be used in order to prevent or inhibit water or moisture from contacting the printed circuit board 59 and subsequently possibly causing a short circuiting of the wiring lines.

The cover 18 assembled with the sensor assembly 50, as shown in FIGS. 7, 8, and 9 and as described above, may then be mounted to the throttle body 1 via screws or a fixing device in order to complete the throttle control device. In the assembled state, the tubular portion 52a of the holder 52 may be positioned on the same axis as the yoke 45, i.e., the rotational axis L of the throttle shaft 9. Preferably the tubular portion 52a is positioned between the magnets, 47 and 48, and is spaced therefrom by a predetermined distance (see FIG. 1). Thereafter, a marker value, i.e., the expected sensor output for the fully closed position of the throttle valve 2, may be written through the terminal pin 18c into the sensor IC 54 as an expected sensor property. The terminal pin 18c is accessible from the outside of the cover 18 for this operation(see FIG. 10). Subsequently, a potting resin (not shown), such as a UV curable resin, may be filled into the recess 18f (see FIG. 10) in order to seal access to the outer end of the terminal pin 18c.

The sensor IC 54 (see FIG. 16) includes a full-bridge circuit (not shown) that includes a pair of magnetoresistive elements (not shown) disposed within the detecting section 55 and displaced from each other in the circumferential direction by an angle of 45°. The computing section 56 may calculate the arctangent of the output from the full-bridge circuit so as to produce linear output signals that correspond to the direction of the magnetic field. The linear output signals are supplied to the control unit. With this arrangement, the direction of the magnetic field can be detected without being influenced by changes in the strength of the magnetic field. In this way, the sensor IC 54 serves as a magnetic detection device, in particular, as a magnetic-field direction detecting device.

Based on the following, signals representing the degree of opening of the throttle valve 2 and outputted from the sensor IC 54, signals representing the traveling speed of the automobile and outputted from a speed sensor (not shown), signals representing the rotational speed of the engine and outputted from a crank angle sensor (not shown), signals representing the depression amount of an accelerator pedal and outputted from an accelerator pedal sensor (not shown), signals from an $O_2$ sensor (not shown), and signals from an airflow meter (not shown) among others, the control unit, i.e., the ECU, may serve to adjust and control various parameters such as fuel injection control, correction control of the degree of opening of throttle valve 2, and variable speed control of an automatic transmission.

Figure 4:
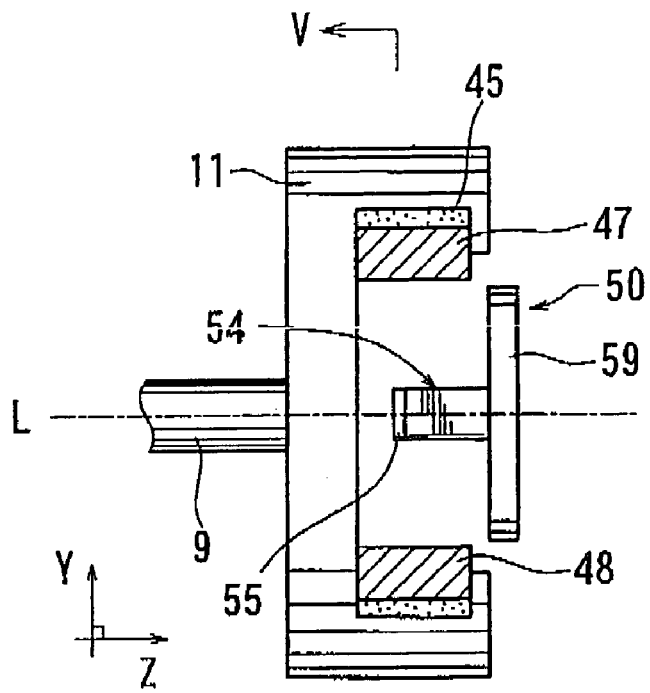
FIG. 4 is a schematic view showing magnets of a detecting device.
Figure 5:
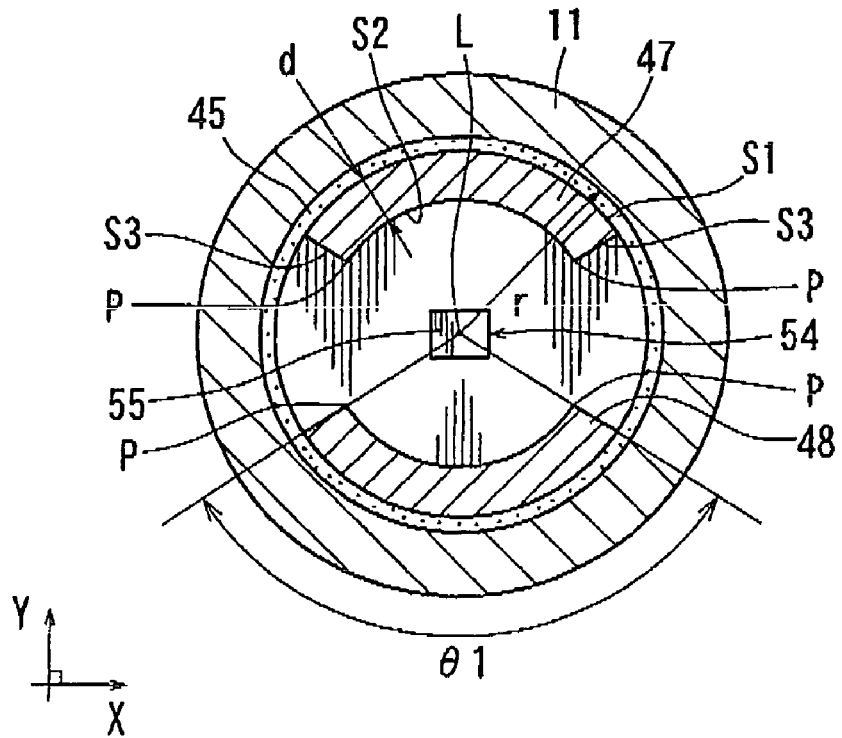
FIG. 5 is a cross sectional view taken along line V—V in FIG. 4.

Next, the arrangement of the magnets 47 and 48 will be described in detail. As shown in FIGS. 4 and 5, each of the magnets 47 and 48 has an arc-shaped configuration along the inner peripheral surface of the yoke 45. The magnets 47 and 48 are positioned symmetrically with respect to the rotational axis L of the throttle shaft 9. The magnets 47 and 48 are magnetized such that the magnetic lines of the magnetic field extend substantially parallel to each other in the vertical direction (as viewed in FIG. 6). In other words, the magnets 47 and 48 produce parallel magnetic lines within a region of the inner space of the yoke 45.

Preferably, the magnets 47 and 48 may be made of ferritic magnetic material. The ferritic magnetic material is advantageous for use because the ferritic magnetic material can be more easily formed to have an arc-shaped configuration than in comparison with rare earth magnetic material. In general, ferritic magnetic material is relatively soft but has a better toughness than rare earth magnetic material. In addition, ferritic magnetic material can typically be purchased at a lower cost than rare earth magnetic material.

As shown in FIG. 5, each of the magnets 47 and 48 has an outer peripheral surface S1 and an inner peripheral surface S2. Both peripheral surfaces have arc-shaped configurations about the rotational axis L of the throttle shaft 9. In addition, each of the magnets 47 and 48 has a thickness d in the radial direction about the rotational axis L. The outer peripheral surface S1 has a radius or curvature that is substantially equal to the radius of curvature of the inner peripheral surface of the yoke 45. Further each of the magnets 47 and 48 has opposing circumferential end surfaces S3 that extend along a radial direction about the rotational axis L.

Furthermore, as shown in FIG. 5, each of the magnets 47 and 48 has a circumferential length defined by an angle $\theta 1$ about the rotational axis L of the throttle shaft 9 (see FIG. 4). In other words, circumferential edges P of the inner peripheral surface S2 are spaced from each other by an angle $\theta 1$ about the rotational axis L.

The angle $\theta 1$ is chosen in order to minimize the possible error of the output signals to within a predetermined value. The possible error from the sensor IC 54 may be caused due to displacement away from an ideal location of the magnets 47 and 48 in the radial direction, relative to the sensor IC. Thus, by choosing an appropriate angle value of the angle $\theta 1$, almost all of the magnetic lines (indicated by arrows in FIG. 6) may extend parallel to each other in the magnetic field produced by the magnets 47 and 48. However, if the angle $\theta 1$ is too small, magnetic lines on both sides of the magnetic field may not extend parallel to the central magnetic lines. This results in a potentially reduced region of parallel magnetic lines. On the other hand, if the angle $\theta 1$ is too large, magnetic lines on both sides of the magnetic field also may not extend parallel to the central magnetic lines. Again resulting in a potentially reduced region of parallel magnetic lines. The greater the reduction in the region of parallel magnetic lines, the greater the chance for error or the actual error level of the output signals from the sensor IC54.

Figure 6:
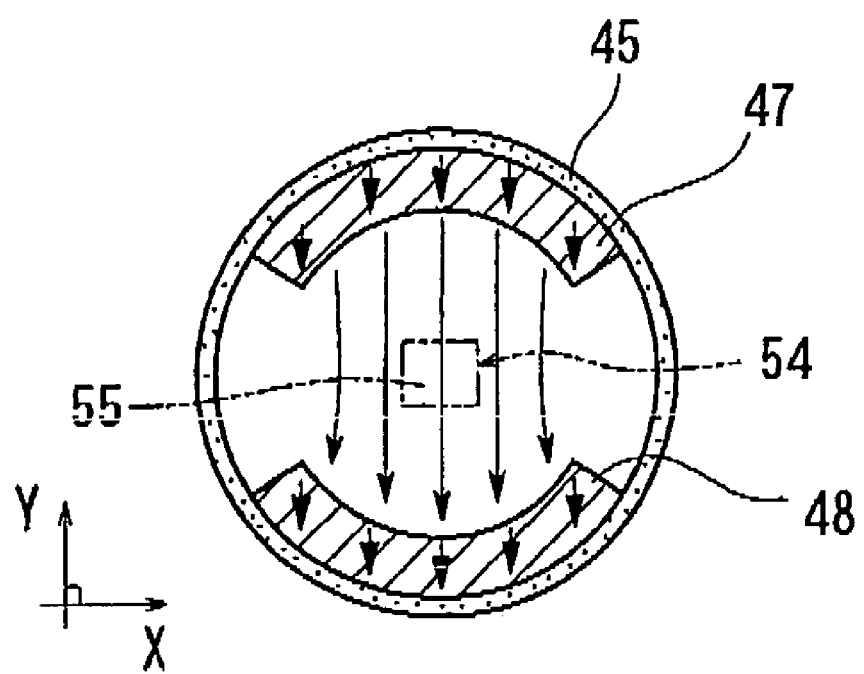
FIG. 6 is a cross sectional view showing magnetic field lines that may be produced when the angular dimensions of the magnets are appropriately determined.

By choosing an appropriate angle $\theta 1$ such that almost all of the magnetic lines of the magnetic field produced by the magnets 47 and 48 extend parallel to one another, as shown in FIG. 6, the output signals from the sensor IC 54 may be consistent even across some deviations of the positional relationship between the magnets, 47 and 48, and the sensor IC 54. In other words, relatively large amounts of displacement of the position of the sensor IC 54 relative to the magnets, 47 and 48, is tolerated without resulting in a significant error in the readings of the sensor IC 54.

In operation of the representative throttle control device, when the engine is started the control unit, e.g., an ECU, may output control signals to the motor 4 in order to affect or alter the degree of rotation of the motor 4 (see FIG. 1). As described previously, the rotational force of the motor 4 may then be transmitted to the throttle valve 2 via the speed reduction mechanism 35. The throttle valve 2 is consequently rotated to open or close the intake air channel 1a of the throttle body 1 (see FIG. 2). As a result, the flow rate of the intake air through the intake air channel 1a is controlled via the control unit, e.g., the ECU. In addition, as the throttle shaft 9 rotates, the throttle gear 11 rotates together with the yoke 45 and the magnets 47 and 48 attached thereto. The direction of the magnetic field produced by the magnets 47 and 48 across the sensor IC 54 is altered in relation to the rotation of the magnets 47 and 48. Therefore, the output signals of the sensor IC 54 may be also be altered. The control unit may receive the output signals from the sensor IC 54. The control unit may then determine the corresponding rotational angle of the throttle shaft 9 based on the output signals.

Incidentally, in this representative embodiment, the cover 18 may be selectively replaced with any of the following three alternative configurations:

(First Alternative Cover Configuration)

Figure 29:
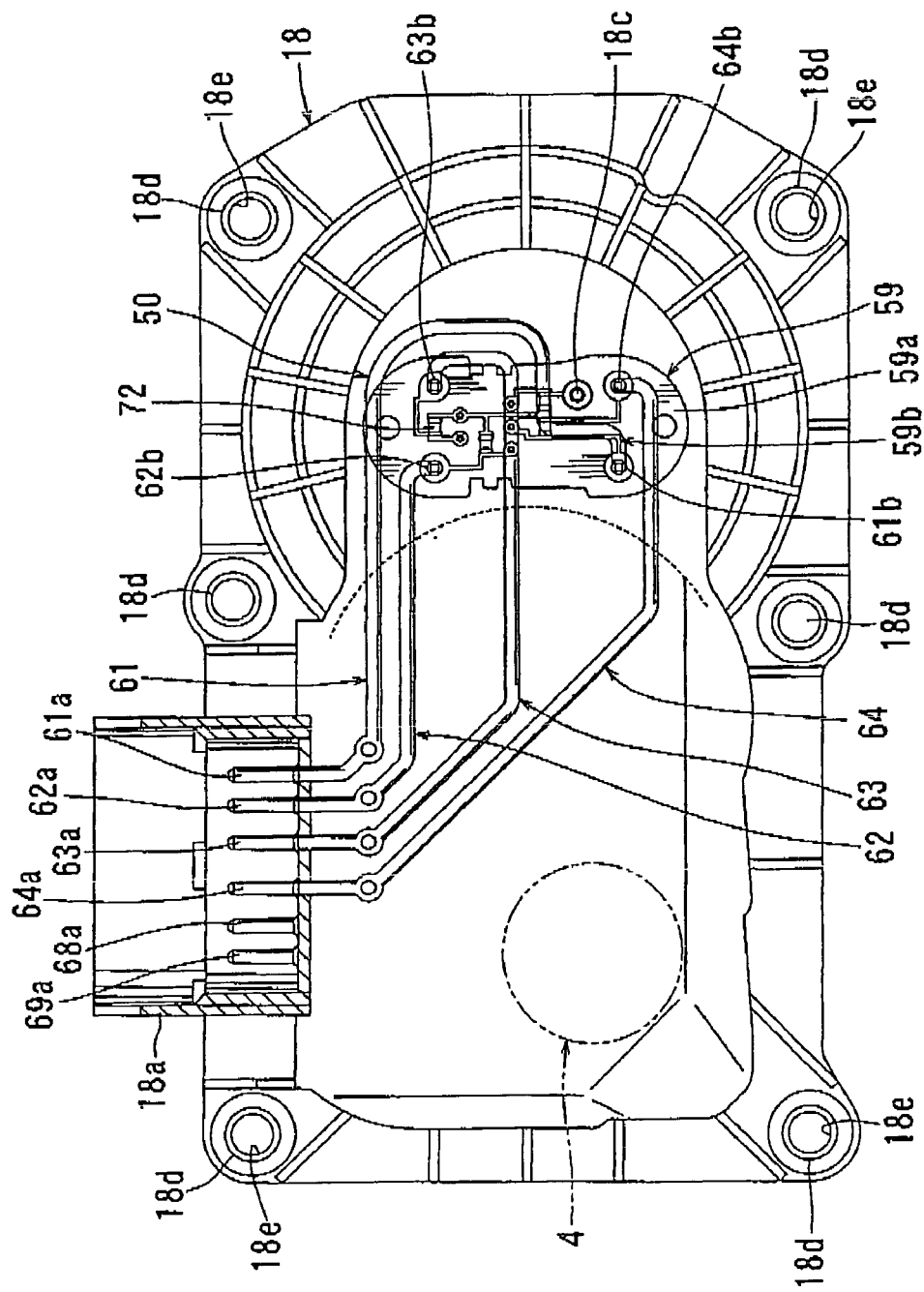
FIG. 29 is a broken-away side view of a first alternative configuration of the cover.

The first alternative cover configuration is shown in FIG. 29 and differs from the configuration shown in FIG. 7 primarily in that the connecting targets of the first terminal end 61*b* of the terminal 61 (signal output terminal) and the first terminal end 63*b* of the terminal 63 (signal output terminal) are interchanged with each other. Thus, the first terminal end 61*b* of the terminal 61 is inserted into the through-hole 59*d*3 formed in the printed circuit board 59 (see FIG. 22) so as to be electrically connected with the inner wall thereof. And the first terminal end 63*b* of the terminal 63 is inserted into the through-hole 59*d*1 (see FIG. 22) so as to be electrically connected with the inner wall thereof. The arrangement of the second terminal ends, 61*a*, 62*a*, 63*a*, and 64*a*, within the connector portion 18*a* is the same as the arrangement of the second terminal ends in the cover 18 of the representative embodiment. By utilizing this alternative configuration of the cover 18 in place of the configuration of the representative embodiment, the rotational direction of the motor 4 may be altered so as to rotate in an opposite direction without having to change the order of the external terminals of the external connector.

(Second Alternative Cover Configuration)

Figure 30:
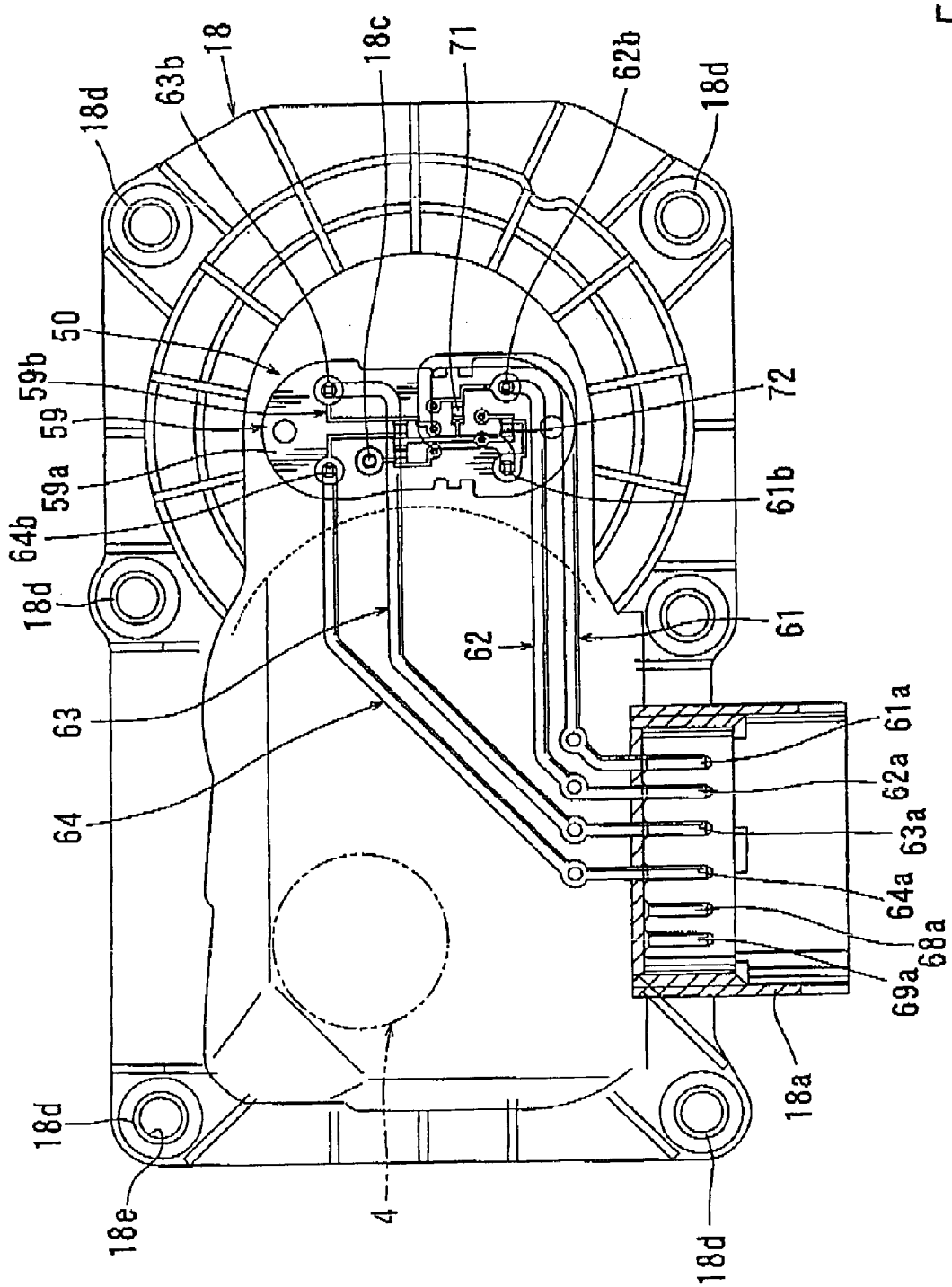
FIG. 30 is a broken-away side view of a second alternative configuration of a cover.

The second alternative cover configuration is shown in FIG. 30 and differs from the configuration shown in FIG. 7 essentially in that the connector portion 18*a* as well as the second terminal ends, 61*a*, 62*a*, 63*a*, and 64*a*, are oriented vertically downward, without a change in the order of arrangement of the second terminal ends, 61*a*, 62*a*, 63*a*, and 64*a*. In this connection orientation, the sensor assembly 50 is mounted to the cover 18, rotated 180° from the position of the sensor assembly 50 of the representative embodiment shown in FIG. 7 (and also 180° from the alternative configuration shown in FIG. 29). However, the connecting targets between the first terminal ends, 61*b*, 62*b*, 63*b*, and 64*b*, of the terminals, 61, 62, 63, and 64, and the through-holes 59*d*1, 59*d*2, 59*d*3, and 59*d*4, formed in the printed circuit board 59 (see FIG. 22) are the same as the connecting targets of the representative embodiment shown in FIG. 7. In addition, although not entirely shown in FIG. 30, the motor 4 and the motor terminals, 68 and 69 (see FIG. 8), may be positioned in the vertical direction symmetrical to their positions in the representative embodiment shown in FIG. 7 (two-dash lines mark the location of the motor in FIG. 30). By utilizing this alternative configuration of the cover 18 in place of the configuration of the representative embodiment, it is possible to accommodate a design including an external connector that requires the second terminal ends, 61*a*, 62*a*, 63*a*, and 64*a*, to be oriented vertically downward.

(Third Alternative Cover Configuration)

Figure 31:
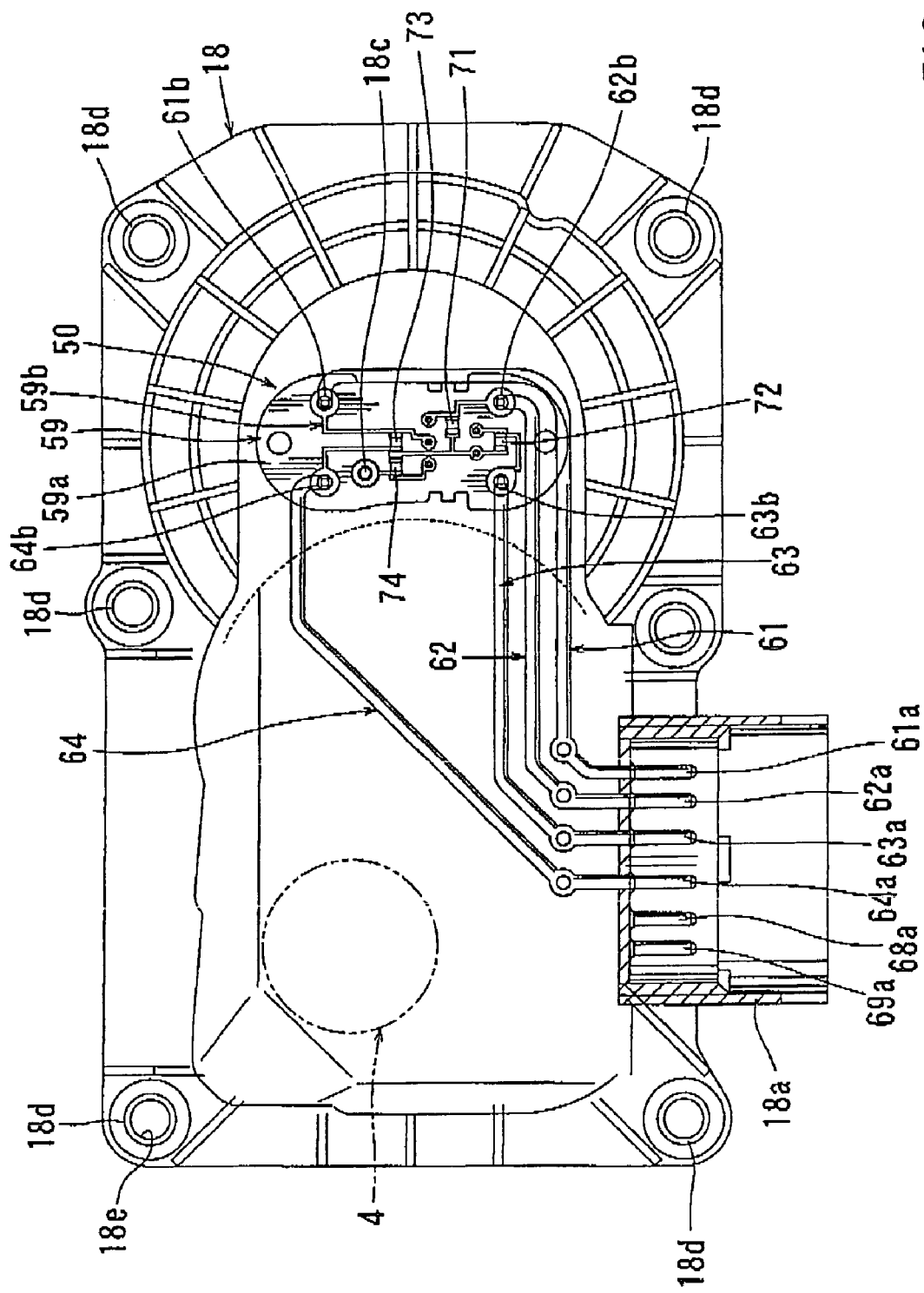
FIG. 31 is a broken-away side view of a third alternative configuration of a cover.

The third alternative cover configuration is shown in FIG. 31 and differs from the second alternative configuration shown in FIG. 30 essentially in that the connecting targets of the first terminal end 61*b* of the terminal 61 (signal output terminal), and the first terminal end 63*b* of the terminal 63 (signal output terminal), are interchanged with one another. Thus, the first terminal end 61*b* of the terminal 61 is inserted into the through-hole 59*d*3 formed in the printed circuit board 59 (see FIG. 22) so as to be electrically connected to the inner wall thereof. The first terminal end 63*b* of the terminal 63 is inserted into the through-hole 59*d*1 (see FIG. 22) so as to be electrically connected to the inner wall thereof. The order of the arrangement of the second terminal ends, 61*a*, 62*a*, 63*a*, and 64*a*, within the connector portion 18*a* is the same as the order of the arrangement of the cover 18 of the representative embodiment. By utilizing this alternative configuration of the cover 18 in place of the second alternative configuration, the rotational direction of the motor 4 may be changed to rotate in an opposite direction without having to change the order of the external terminals of the external connector.

The representative embodiment is advantageous in the following aspects:

(1) The sensor IC 54, having the magnetic sensing section 55 and the computing section 56 connected in series with each other via the connecting terminals 57, is disposed within the holder 52 or within the throttle body 1 in such a state that the sensing section 55 may be inclined relative to the computing section 56 through the bending of the connecting terminals 57. Therefore, the overall length of the sensor IC 54 may be relatively short when measured along the connecting direction between the sensing section 55 and the computing section 56 (the right and left direction as viewed in FIG. 1). As a result, a throttle body 1 including the sensor IC 54 may have a more compact outer configuration.

(2) The sensor IC 54 detects the direction of the magnetic field produced by the magnets 47 and 48 mounted to the throttle shaft 9. The control unit may then determine the rotational angle of the throttle shaft 9, i.e., the degree of opening of the throttle valve 2, based upon the output signals produced by the sensor IC 54. Because the sensor IC 54 detects a change in the direction of the magnetic field, the output signals may not be unduly or substantially influenced by unintended displacements of the magnets 47 and 48, possibly due to displacement of the throttle shaft 9. In addition, the output signals may not be unduly or substantially influenced by changes in the strength of the magnetic field due to fluctuating temperatures and the thermal characteristics of the magnets 47 and 48. The displacement of the throttle shaft 9 primarily means the displacement of position relative to the sensor IC 54. Such displacement may be caused by various reasons, including but not limited to error in mounting the throttle shaft 9, differences in the thermal expansion coefficients between the throttle body 1 and the cover 19, vibration of the throttle shaft 9 or the bearings 8 and 10 due to wear, and thermal expansion of the resin (i.e., throttle gear 11) that is molded with the magnets 47 and 48 through an insertion molding process.

Therefore, the sensor IC 54 can accurately detect the direction of the magnetic field, improving the accuracy of the detection of the degree of opening of the throttle valve 2. This feature is particularly advantageous if the throttle body 1 is made of a resin that cannot be accurately molded. This feature is also advantageous if the throttle body 1 and the cover 18 are made of different materials from one another, for example, where the throttle body 1 is made of metal and the cover 18 is made of resin.

(3) Because the sensor IC 54 is mounted to the holder 52 and the holder 52 with the sensor IC 54 is mounted to the cover 18, the sensor 50 (holder 52 with the sensor IC 54) can be commonly used for various configurations of covers 18.

(4) Because the location of the holder 52 relative to the sensor IC 54 can be established by the positioning device between the holder 52 and the cover 18, i.e., through engagement between the positioning projections 18*b* of the cover 18 with the positioning holes 52*c* and 59*h* of the holder 52, the sensor IC 54 can be accurately positioned relative to the throttle body 1, in particular, relative to the magnets 47 and 48. Therefore, the accuracy in assembling the sensor IC 54 to the throttle body 1 can be improved.

(5) The sensor IC 54 may be fixed in position relative to the holder 52 by using a potting resin 58 that is filled into the holder 52 having previously disposed the sensor IC 54 therein. Therefore, the sensor IC 54 may be reliably protected against potential external forces that may be applied to the holder 52 during transportation and handling. This may enable the production of the sensor assembly 50 to be performed at a different site than the assembling operation of the sensor assembly 50 to the cover 18.

(6) Potting resin 58 sealingly encloses the sensor IC 54 within the holder 52. Therefore the sensor IC 54 may be advantageously protected not subject to substantial influence by moisture. In addition, the fixing operation of the sensor IC 54 within the holder 52 through the use of potting resin 58 can be performed in a relatively short time period, improving the yield ratios of the manufacturing of the holder 52 and sensor IC 54 combination. Further, because inexpensive resins can be used as a potting resin 58, the overall manufacturing cost can be reduced. If a transfer molding process is used for molding a resin with the sensor IC 54, a relatively long time period is required to fix the sensor IC 54 into position, resulting in a relatively low yield ratio of the molded products. In addition, since a relatively expensive epoxy resin is generally used for a transfer molding process, this process may result in increased manufacturing cost. The use of a potting resin 58 that is filled into the holder 52 addresses these problems.

(7) Because the first to fifth parallel connecting terminals, 54a, 54b, 54c, 54d, and 54e, of the sensor IC 54 (see FIG. 16) can be held so as to be protected by the resin, potential breakage of the connecting terminals 54a, 54b, 54c, 54d, and 54e, can be reliably prevented or minimized due to vibration or other forces during the transportation of the holder 52.

However, as an alternative to filling potting resin 58 into the holder 52, the holder 52 may be molded integrally with the sensor IC 54 by utilizing an insertion molding process and resin. The sensor IC 54, fixed in position by such an insertion molding process, may also be protected against possible external forces applied during the transportation of the holder 52.

(8) The terminals 61, 62, 63, and 64, of the cover 18, are electrically connected to the printed circuit board 59 to which the respective first to fifth connecting terminals 54a, 54b, 54c, 54d, and 54e, of the sensor IC 54 (see FIG. 15) are electrically connected. In addition, the sensor IC 54 and the printed circuit board 59 are assembled with the holder 52 into the sensor assembly 50. Therefore the sensor IC 54 and the printed circuit board 59 are fixed in position relative to the holder 52. The sensor assembly 50 may then be mounted to the cover 18. The sensor assembly 50 may be commonly mounted to different types of covers (such as those having the configuration shown in FIG. 7 and first to third alternative configurations that are described previously). As a result, many limitations to the development of different types of covers may be removed or minimized.

(9) Because the printed circuit board 59 is integrated with the holder 52 and the sensor IC 54 to form the sensor assembly 50 (see FIGS. 13, 14, and 15), the position of the printed circuit board 59 can be consistently maintained.

(10) As described in connection with the first to third alternative configurations of the cover 18, the rotational direction of the motor 4 and the orientation of the second terminal ends, 61a, 62a, 63a, and 64a, of the terminals, 61, 62, 63, and 64, can be changed without changing the arrangement (order) of the second terminal ends 61a, 62a, 63a and 64a. Therefore, an external connector used to connect to the connecting portion 18a may be common for different types of covers.

(11) The capacitors 71, 72, 73, and 74, (see FIG. 22) are electrically connected respectively between the wiring line 59a4 and the other wiring lines 59a1, 59a2, 59a3, and 59a5, of the wiring pattern 59b of the printed circuit board 59. In other words, the capacitors 71, 72, 73, and 74, are electrically connected respectively between the connecting terminal 54d (ground terminal) and the other connecting terminals 54a, 54b, 54c, and 54e (see FIG. 15). Due to this configuration, the sensor IC 54 may be reliably prevented from unintended application of high voltage, for example due to an electrostatic charge.

(12) The capacitors 71 to 74 are mounted to the printed circuit board 59, to which the connecting terminals 54a to 54e of the sensor IC 54 (see FIG. 15) are electrically connected and to which the terminals 61 to 64 (see FIG. 7) are also connected, in order to establish an electrical connection between the connecting terminals 54a to 54e and the corresponding external terminals of the external connector. Therefore, by appropriately designing the printed circuit board 59 (i.e., particularly the wiring pattern 59b shown in FIG. 7), it is possible to connect the capacitors 71 to 74 between the connecting terminal 54d (ground terminal) with the other connecting terminals, 54a, 54b, 54c, and 54e, of the sensor IC 54 (see FIG. 15) without requiring complicated three-dimensional intersections of the terminals 61 to 64. Therefore, the relative manufacturing cost can be reduced and a more reliable operation of the capacitors 71 to 74 can be ensured.

(13) Because the terminals 61 to 64 are integrated with the cover 18 by an insert molding process using resin, the terminals 61 to 64 can be accurately and reliably positioned relative to the cover 18. The insert molding process may be applied to any of the alternative configurations of the cover 18.

(14) The magnets 47 and 48 are attached to the inner peripheral surface of the ring-like yoke 45. The yoke 45 is made of magnetic material and is mounted to the throttle gear 11 so as to have the same central axis as the rotational axis L of the throttle shaft 9. Furthermore, the magnets 47 and 48 are magnetized such that the magnetic lines of the magnetic field produced by the magnets 47 and 48 extend substantially parallel to one another across a region of the yoke 45. The magnets 47 and 48, and the yoke 45, may form a magnetic circuit such that almost all of the magnetic lines produced by the magnets 47 and 48 extend parallel to each other as shown in FIG. 6. The parallel nature of the magnetic field lines may further improve the sensor IC 54 detection accuracy of the direction of the magnetic field.

(15) The angle $\theta 1$ of the magnets 47 and 48 around the rotational axis L is chosen in order to keep the error level in the output signals of the sensor IC 54 (e.g., due to displacement of the magnets 47 and 48 from their ideal set positions relative to the sensor IC 54) below a predetermined value. The detection accuracy of the sensor IC 54 in determining the direction of the magnetic field can also be improved by accurately determining the angle $\theta 1$ of the magnets 47 and 48.

The present invention may not be limited to the above representative embodiments but may be modified in various ways. The following include, but do not limit, possible modifications of the above representative embodiment:

(a) The sensor IC 54 may be replaced with any other type of magnetic detection device. However, the magnetic detection device should be able to detect the strength or direction of the magnetic field produced between the magnets 47 and 48. In addition, the magnetic detection device may include a magnetic detection section having a magnetic detection element such as a magnetoresistive element and a Hall element. The magnetic detection section may be connected to a computing section.

(b) Lead wires, flexible terminals, or printed circuit boards, among other known electrical connection techniques, may connect the detecting section 55 and the computing section 56. Further, the detecting section 55 of the sensor IC 54 may be inclined in alternative directions to the inclined direction shown in FIG. 16. In addition, although the angle of inclination of the detecting section 55 is preferably 90°, the inclination angle may be more than or less than 90°.

(c) Although the throttle body 1 and the cover 18 are preferably made of resin, they may be made of metal, for example, such as aluminum alloy. Similarly, although the throttle valve 2 is also preferably made of resin, the throttle valve 2 may be made of metal, include examples such as aluminum alloy and stainless steel.

(d) The direction of the rotation of the motor 4 or the orientation of the second terminal ends, 61*a*, 62*a*, 63*a*, and 64*a*, of the terminals, 61, 62, 63, and 64, may be changed without having to change the arrangement (order) of the second terminal ends, 61*a*, 62*a*, 63*a*, and 64*a*. The second terminal ends 61*a*, 62*a*, 63*a*, and 64*a*, may be oriented to any other direction, for example such as a right direction or a left direction, in addition to the upward and downward directions.

(e) Although the sensor arrangement 50 is mounted to the cover 18, the sensor arrangement 50 may be mounted to different components in addition to the cover 18. Any component is acceptable as long as the mounting can fix the location of the sensor assembly 50 relative to the throttle body 1.

(f) Various types of substrates, such as multi-layer substrate can be used as the substrate of the printed circuit board 59.

(g) Although the magnets 47 and 48 are preferably made of ferritic magnetic materials, any other kind of magnetic material, for example, such as rare earth magnetic material, can be used for the magnets 47 and 48.

This invention claims:

1. A throttle control device comprising:
a throttle body defining an intake air channel;
a throttle shaft having a rotational axis:
a throttle valve mounted to the throttle shaft and disposed within the intake air channel;
a motor coupled to the throttle shaft, so that the throttle valve rotates to open and close the intake air channel as the motor is driven: and
a detection device arranged and constructed to detect a degree of opening of the throttle valve, the detection device comprising:
a pair of magnets mounted to the throttle shaft and positioned to oppose each other with respect to the rotational axis in order to produce a magnetic field;
a sensor fixed relative to the throttle body and arranged and constructed to detect the magnetic field, wherein the sensor comprises:
a sensing section, and
a computing section
wherein the sensing section is connected to the computing section and is inclined relative to the computing section.

2. The throttle control device as in claim 1, wherein the sensing section and the computing section are connected to each other via connecting terminals that are bent by a predetermined angle.

3. The throttle control device as in claim 2, wherein the predetermined angle is approximately 90°.

4. The throttle control device as in claim 1, wherein each of the sensing section and the computing section has a substantially flat-plate shaped configuration.

5. The throttle control device as in claim 1, wherein the sensor is arranged and constructed to detect the direction of the magnetic field.

6. The throttle control device as in claim 1, further including
a holder adapted to be fixed relative to the throttle body, wherein the sensor is mounted to the holder.

7. The throttle control device as in claim 6, further including
a positioning device arranged and constructed to determine the position of the holder relative to the throttle body;
wherein the positioning device comprises:
a positioning projection formed on one of the holder and a component of the throttle body, and
a corresponding positioning hole formed on the other of the holder and a component of the throttle body and engageable with the positioning projection, and
wherein positioning projection has one end deformed to have a diameter substantially greater than a diameter of the positioning hole after the positioning projection has inserted into the positioning hole.

8. The throttle control device as in claim 7, wherein
the component of the throttle body comprises a cover mounted to the throttle body,
wherein the positioning projection is formed on the cover; and
wherein the positioning hole is formed in the holder.

9. The throttle control device as in claim 6, wherein the holder has a hollow configuration with a bottom, and
wherein the sensor is disposed within the holder such that the sensing section contacts the bottom of the holder.

10. The throttle control device as in claim 6, wherein the sensor is disposed within the holder, and
wherein the sensor is fixed in position relative to the holder by a potting resin that is filled into the holder and sensor combination.

11. The throttle control device as in claim 6, wherein the sensor is fixed in position relative to the holder by an insertion molding process using a resin material.

12. The throttle control device as in claim 6, wherein the detection device further includes
a printed circuit board,
wherein the printed circuit board is electrically connected to the sensor via a first terminal, and
wherein the sensor and the printed circuit board are mounted to the holder to form a sensor assembly, and
wherein the sensor assembly is fixed relative to the throttle body.

13. The throttle control device as in claim 12, wherein the detection device further includes
a second terminal electrically connected to the printed circuit board,
wherein the second terminal provides an electrical connection between the printed circuit board and a corresponding external terminal.

14. The throttle control device as in claim 13, wherein the second terminal further includes a first terminal end, and a second terminal end oriented in one direction, and wherein two or more second terminal ends are arranged in a predetermined order, and wherein the detection device is configured to permit change of at least one of the orientation of the second terminal end of the second terminal and the rotational direction of the motor without affecting an arrangement order of the second terminal end of the second terminals.

15. The throttle control device as in claim 14, wherein the printed circuit board further includes a wiring pattern, wherein the wiring pattern is configured to enable change of two or more connecting points of the corresponding first terminal ends in order to change the direction of rotation of the motor.

16. The throttle control device as in claim 15, wherein the detection device further includes at least one capacitor, and wherein the printed circuit board is electrically connected to the sensor via the first terminals, and wherein three or more first terminals are further defined as including an input terminal, an output terminal, and a ground terminal, and wherein the ground terminal and each input and output terminals are electrically connected by the corresponding capacitor, and wherein the capacitors are mounted on the printed circuit board.

17. The throttle control device as in claim 6, wherein the detection device further includes a second terminal electrically connected to the printed circuit board, wherein the second terminal is able to provide an electrical connection between the printed circuit board and a corresponding external terminal.

18. The throttle control device as in claim 17, wherein the second terminal further includes a first terminal end, and a second terminal end oriented in one direction, and wherein two or second terminal ends are arranged in a predetermined order, and wherein the detection device is configured to permit change of at least one of the orienting direction of the second terminal end and the rotational direction of the motor without changing the predetermined order of the second terminal end.

19. The throttle control device as in claim 18, wherein the printed circuit board further includes a wiring pattern, wherein the wiring pattern configured to enable change of two or more connecting points of the corresponding first terminal ends in order to change the direction of rotation of the motor.

20. The throttle control device as in claim 19, wherein the second terminals are integrated with a component of the throttle body, wherein the component is molded using a resin material, and wherein the sensor and the printed circuit board are assembled into a sensor assembly, and wherein the sensor assembly is mounted to the component.

21. The throttle control device as in claim 20, wherein the component is further defined as a removable cover.

22. A throttle control device comprising:

a throttle body defining an intake air channel;

a throttle shaft having a rotational axis:

a throttle valve mounted to the throttle shaft and disposed within the intake air channel;

a motor coupled to the throttle shaft, so that the throttle valve rotates to open and close the intake air channel as the motor is driven: and a detection device arranged and constructed to detect a degree of opening of the throttle valve, the detection device comprising:

a pair of magnets mounted to the throttle shaft and positioned to oppose to each other with respect to the rotational axis in order to produce a magnetic field;

a sensor mounted to the throttle body and arranged and constructed to detect the magnetic field, a printed circuit board electrically connected to the sensor via first terminals and a holder, wherein the sensor and the printed circuit board are mounted to the holder to form a sensor assembly that is mounted to a part of the throttle body, and a cover mounted to the throttle body and defining a part of the throttle body;

wherein the detection device further includes second terminals attached to the cover, and wherein the second terminals are electrically connected to the first terminals of the printed circuit board at the same time that the cover is mounted to the throttle body.

23. The throttle control device as in claim 22, wherein each of the second terminals is able to provide an electrical connection between the printed circuit board and a corresponding external terminal.

24. The throttle control device as in claim 23, further including a positioning device arranged and constructed to establish the position of the holder relative to a component of the throttle body, wherein the positioning device comprises:

a positioning projection formed on one of the holder and the component of the throttle body, and a corresponding positioning hole formed on the other of the holder and the component of the throttle body and engageable with the positioning projection, and wherein positioning projection has one end deformed to have a diameter substantially greater than a diameter of the positioning hole after the positioning projection has inserted into the positioning hole.

25. The throttle control device as in claim 24, wherein the component of the throttle body comprises a cover mounted to the throttle body, wherein the positioning projection is formed on the cover; and wherein the positioning hole is formed in the holder.

26. The throttle control device as in claim 23, wherein the second terminal further includes a first terminal end, and a second terminal end oriented in one direction, and wherein two or more second terminal ends are arranged in a predetermined order, and wherein the detection device is configured to permit change of at least one of the orienting direction of the second terminal end and the rotational direction of the motor without changing the predetermined order of the second terminal end.

27. The throttle control device as in claim 26, wherein the printed circuit board further includes a wiring pattern,
wherein the wiring pattern is configured to enable change of two or more connecting points of the first terminal ends in order to change the direction of rotation of the motor.

28. The throttle control device as in claim 22 wherein the holder is further defined as including
a cavity, and
wherein the sensor is disposed within the cavity.

29. The throttle control device as in claim 28, wherein the sensor is fixed in position relative to the holder by a potting resin.

30. The throttle control device as in claim 22, wherein the sensor is fixed in position relative to the holder by an insert molding process using a resin material.

31. A throttle control device comprising:
a throttle body defining an intake air channel;
a throttle shaft having a rotational axis:
a throttle valve mounted to the throttle shaft and disposed within the intake air channel;
a motor coupled to the throttle shaft, so that the throttle valve rotates to open and close the intake air channel as the motor is driven: and
a detection device arranged and constructed to detect a degree of opening of the throttle valve, the detection device comprising:
  a pair of magnets mounted to the throttle shaft and positioned to oppose to each other with respect to the rotational axis in order to produce a magnetic field;
  a sensor mounted to the throttle body and arranged and constructed to detect the magnetic field,
  a printed circuit board electrically connected to the sensor via three or more first terminals, and
  a capacitor,
wherein the first terminals further include an input terminal, an output terminal, and a ground terminal, and
wherein the ground terminal and the input and output terminals are electrically connected by the corresponding capacitor, and
wherein the capacitors are mounted on the printed circuit board.

32. The throttle control device as in claim 31, wherein the detection device further includes
a second terminal electrically connected to the printed circuit board,
wherein the second terminal is able to provide an electrical connection between the printed circuit board and a corresponding external terminal.

33. The throttle control device as in claim 32, wherein the second terminal further includes
a first terminal end, and
a second terminal end oriented in one direction
wherein two or more second terminal ends are arranged in a predetermined order, and
wherein the detection device is configured to permit change of at least one of the orienting direction of the second terminal end and the rotational direction of the motor without changing the predetermined order of the second terminal end.

34. The throttle control device as in claim 33, wherein the printed circuit board further includes
a wiring pattern, and
wherein the wiring pattern is configured to enable the changing of two or more connecting points of the corresponding first terminal ends in order to change the direction of rotation of the motor.

35. The throttle control device as in claim 32, wherein the second terminal is integrated with a component of the throttle body,
wherein the component is molded by a resin, and
wherein the second terminal is insert molded into the component, and
wherein the sensor and the printed circuit board are assembled into a sensor assembly that is fixed relative to the component.

36. The throttle control device as in claim 35, wherein the sensor is arranged and constructed to detect the direction of the magnetic field.

37. The throttle control device as in claim 36, wherein the component is further defined as a removable cover.

* * * * *